(12) United States Patent
Gyory et al.

(10) Patent No.: US 8,826,601 B2
(45) Date of Patent: Sep. 9, 2014

(54) MODULAR ASSEMBLY

(75) Inventors: Janos B. Gyory, Miami, FL (US);
Istvan Gyory, Miami, FL (US)

(73) Assignee: Modular Container Solutions LLC, Doral, FL (US)

( * ) Notice: Subject to any disclaimer, the term of this patent is extended or adjusted under 35 U.S.C. 154(b) by 0 days.

(21) Appl. No.: 13/503,145

(22) PCT Filed: Oct. 21, 2010

(86) PCT No.: PCT/US2010/053468
§ 371 (c)(1),
(2), (4) Date: Jul. 9, 2012

(87) PCT Pub. No.: WO2011/050124
PCT Pub. Date: Apr. 28, 2011

(65) Prior Publication Data
US 2012/0266546 A1   Oct. 25, 2012

(51) Int. Cl.
| | | |
|---|---|---|
| *E04B 1/346* | (2006.01) | |
| *E04H 1/00* | (2006.01) | |
| *E04B 1/00* | (2006.01) | |
| *E04B 1/34* | (2006.01) | |
| *E05D 15/00* | (2006.01) | |
| *E04B 1/344* | (2006.01) | |

(52) U.S. Cl.
CPC .................... *E04B 1/3444* (2013.01)
USPC ........ 52/79.5; 52/64; 52/66; 52/79.1; 52/270; 52/284; 52/143; 52/68; 52/69; 52/745.01; 16/368

(58) Field of Classification Search
USPC .............. 52/64, 66, 79.1, 270, 284, 368, 143, 52/79.5, 71, 68, 69, 745.01; 16/368
See application file for complete search history.

(56) References Cited

U.S. PATENT DOCUMENTS

| | | |
|---|---|---|
| 4,074,475 A | 2/1978 | Wahlquist |
| 4,534,141 A | 8/1985 | Fagnoni |

(Continued)

FOREIGN PATENT DOCUMENTS

| | | |
|---|---|---|
| JP | 9-032325 A | 2/1997 |
| JP | 2004-084310 A | 3/2004 |

(Continued)

OTHER PUBLICATIONS

International Search Report for PCT/US2010/053468 dated Jun. 28, 2011.

(Continued)

*Primary Examiner* — William Gilbert
*Assistant Examiner* — Omar Hijaz
(74) *Attorney, Agent, or Firm* — Sughrue, Mion, PLLC

(57) ABSTRACT

A modular assembly capable of converting from a shipping container configuration into a building unit, and from a building unit into a shipping container configuration. From the shipping container configuration, a plurality of frame panels and unit panels moveably connected to a frame of the modular assembly are selectively positioned to form the floors, walls, and ceilings of the building unit configuration thereby forming a living and/or commercial structure complete with electrical, water and sewage connections. The assembly may include an automated erection system, which may include a system of electric motors, gears, pulleys, cables, automated mechanical arms and electronic controls, located within the container structure of the modular assembly, and which interact with a plurality of frame panels and unit panels to deploy and retract the plurality of frame panels and unit panels for constructing the shipping container configuration and building unit configuration.

6 Claims, 38 Drawing Sheets

(56) References Cited

U.S. PATENT DOCUMENTS

| | | |
|---|---|---|
| 4,635,412 A | 1/1987 | Le Poittevin |
| 4,660,332 A | 4/1987 | Colvin |
| 4,891,919 A | 1/1990 | Palibroda |
| 4,912,891 A | 4/1990 | Bertrand |
| 5,152,109 A | 10/1992 | Boers |
| 5,185,973 A | 2/1993 | Oldani |
| 5,237,784 A | 8/1993 | Ros |
| 5,345,730 A | 9/1994 | Jurgensen |
| 5,761,854 A | 6/1998 | Johnson et al. |
| 5,966,956 A | 10/1999 | Morris et al. |
| 6,003,919 A | 12/1999 | Shook |
| 6,223,479 B1* | 5/2001 | Stockli ............... 52/68 |
| 6,253,498 B1 | 7/2001 | Fanucci |
| 6,345,471 B1* | 2/2002 | Gyllenhammar ............ 52/69 |
| 6,658,799 B1 | 12/2003 | Stoodley |
| 6,712,414 B2 | 3/2004 | Morrow |
| 6,772,563 B2 | 8/2004 | Kuhn |
| 6,889,838 B2* | 5/2005 | Meier et al. ............ 206/508 |
| 6,983,567 B2* | 1/2006 | Ciotti ............... 52/79.5 |
| 7,117,645 B2 | 10/2006 | Bzorgi |
| 7,418,802 B2 | 9/2008 | Sarine et al. |
| 7,631,460 B2 | 12/2009 | Napier |
| 7,647,731 B2 | 1/2010 | Muir |
| 7,658,037 B2 | 2/2010 | Bucher et al. |
| 7,794,001 B2 | 9/2010 | Blackwell et al. |
| 2006/0059792 A1 | 3/2006 | Tiramani |
| 2006/0070306 A1 | 4/2006 | Lin |
| 2006/0185262 A1* | 8/2006 | Abler ............... 52/64 |
| 2006/0201072 A1 | 9/2006 | Gibson |
| 2006/0225369 A1 | 10/2006 | Napier |
| 2006/0225371 A1 | 10/2006 | Shanni |
| 2006/0230704 A1* | 10/2006 | Lambreth ............ 52/745.02 |
| 2007/0113488 A1 | 5/2007 | Wilson |
| 2007/0245637 A1 | 10/2007 | Czyznikiewicz |
| 2009/0031642 A1* | 2/2009 | Donovan ............ 52/79.1 |
| 2009/0217600 A1 | 9/2009 | De Azambuja |
| 2009/0229194 A1 | 9/2009 | Armillas |
| 2010/0024314 A1 | 2/2010 | Pope |
| 2010/0024315 A1 | 2/2010 | Pope |
| 2010/0024317 A1 | 2/2010 | Pope |
| 2010/0050540 A1 | 3/2010 | Bucher et al. |
| 2010/0064599 A1 | 3/2010 | Yang et al. |
| 2010/0064600 A1 | 3/2010 | Napier |
| 2010/0192481 A1* | 8/2010 | Shen et al. ............ 52/79.5 |
| 2012/0017519 A1* | 1/2012 | Peck ............... 52/79.1 |
| 2012/0255240 A1* | 10/2012 | Shen ............... 52/79.5 |
| 2013/0180182 A1* | 7/2013 | Yoo ............... 52/6 |

FOREIGN PATENT DOCUMENTS

| | | |
|---|---|---|
| KR | 2003-008723 A | 1/2003 |
| WO | 2006/133482 A1 | 12/2006 |

OTHER PUBLICATIONS

Written Opinion, dated Jun. 28, 2011, issued in Application No. PCT/US2010/053468 [PCT/ISA/237].

International Search Report with cover page, dated Jun. 28, 2011, issued in Application No. PCT/US2010/053468 [PCT/ISA/210] and [PCT/ISA/220].

* cited by examiner

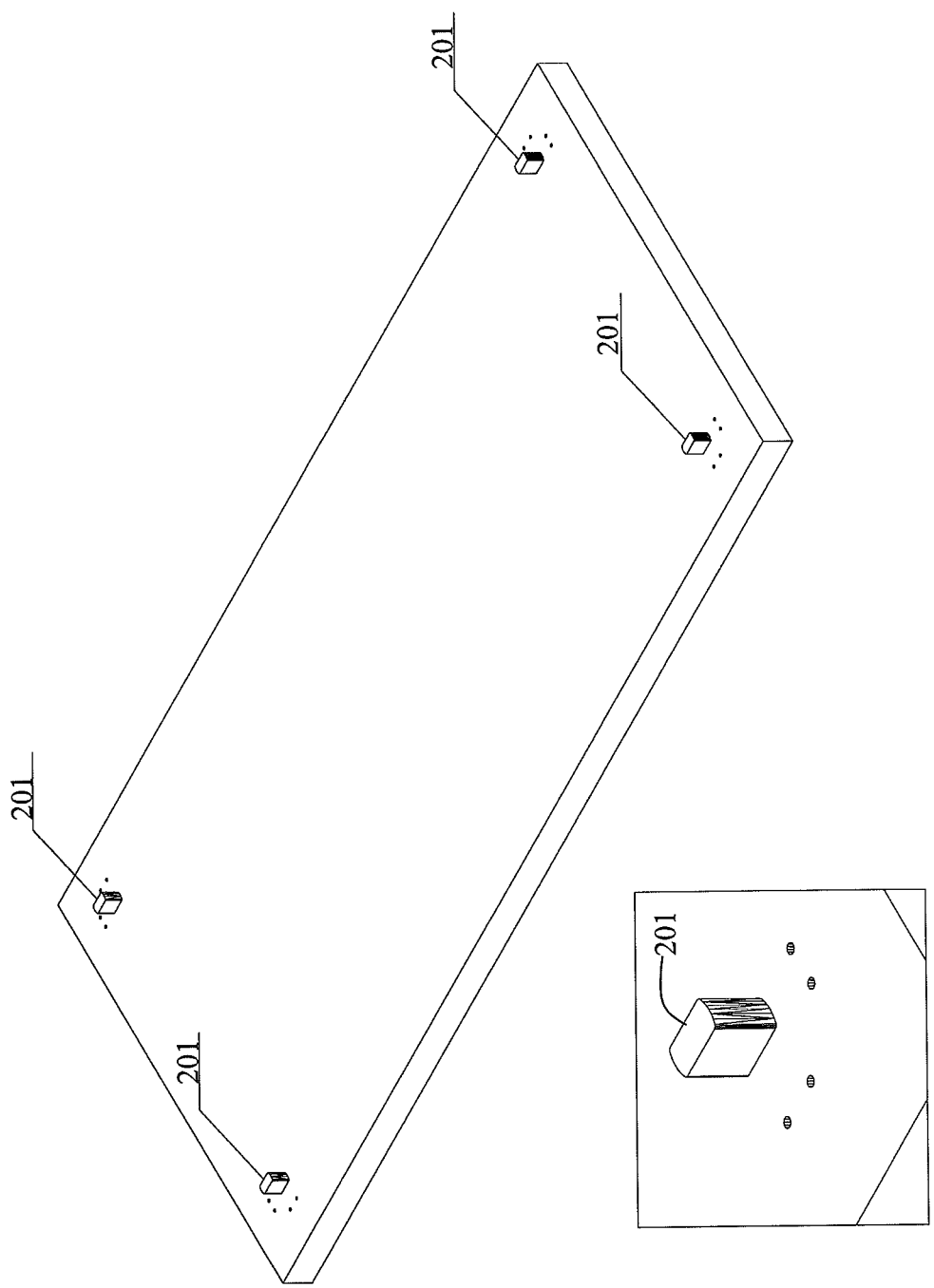

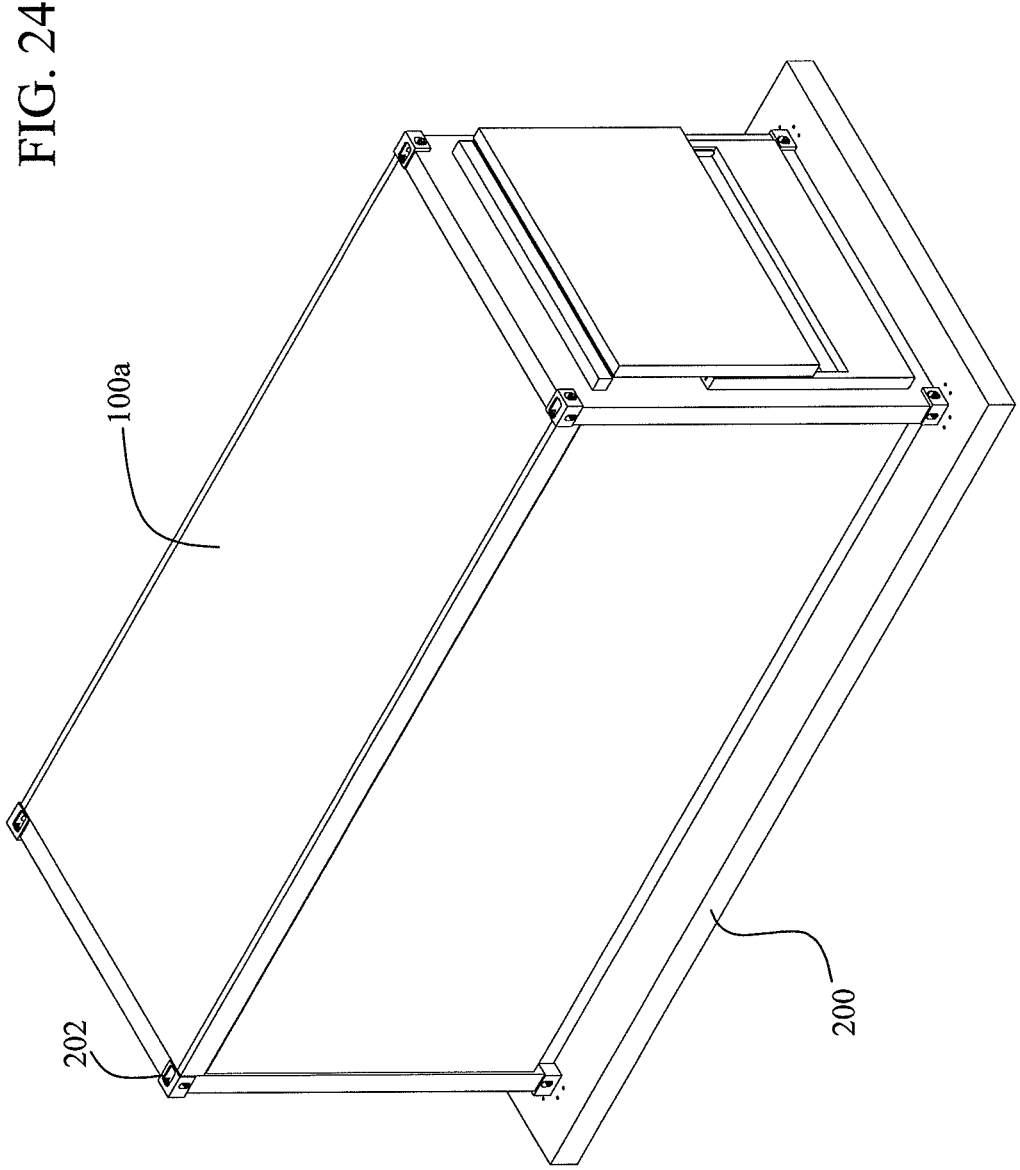

MODULAR ASSEMBLY

CROSS-REFERENCE TO RELATED APPLICATIONS

This application incorporates herein by reference the entire disclosures of U.S. application Ser. No. 12/604,136, filed Oct. 22, 2010, published as US 2010/0269419 on Oct. 28, 2010 and U.S. application Ser. No. 12/148,914, filed Apr. 23, 2008, published as US 2009/0266066 on Oct. 29, 2009 in their entirety.

BACKGROUND OF THE INVENTION

1. Field of the Invention

The present invention relates to the field of modular assemblies, and more particularly, relates to a modular assembly structured to assume either a shipping container configuration or a building unit configuration.

2. Description of the Related Art

Building units are an essential part of everyday life. Houses come in all shapes and sizes, and can be made in various ways from various types of materials. Traditionally, building units are constructed from the ground up in a specific location, for that location. These types of building structures can take weeks or months to construct, requiring many different types of materials and construction phases to complete. Once complete, the building structure remains at its specific location as a then permanent fixture of the landscape.

Recent developments in materials and structural engineering have allowed home builders to construct "mobile" homes: prefabricated, full-sized housing structures that can be transported to a specific location. These mobile homes are assembled in substantial part before being delivered to the specific location. Mobile home transportation requires a "wide-load" configuration involving tractor-trailers as well as lead and follow vehicles. Once at the home site, the mobile home must be furnished and connected to local utilities, such as electrical, water and waste removal systems. The mobile home, once delivered to a specific location, becomes a permanent fixture of the landscape. The advantage to pre-fabricated housing structures lies in the ease of construction. Mobile homes are not constructed at a specific location over weeks or months, but are constructed in a factory, and simply shipped to the specific location. The disadvantages include complex and tenuous transportation.

Portable building units have been around for decades. Lightweight, easily transportable structures provide temporary shelter from the outdoor environment. However, natural disasters and other catastrophes can destroy dwellings, thereby creating a need for fully equipped emergency shelters. These emergency shelters need be easily transported and easily set up in matter of hours. The disadvantages thus far to portable, foldable building units have been numerous: difficult to transport folded configurations; multiple loose panels, multiple unit sections, and difficult hinging and fastening mechanisms; difficult to assemble panels and elements; and a lack of utilities inside the unit. Many recent attempts at portable, foldable building units have led only to exterior structures; once unfolded, the building unit provides a shell dwelling with none of the necessary amenities most homes require. Previous attempts at portable building units have also afforded hard-to-assemble structures that require special tools and sectional construction.

Accordingly, there is a need in the portable building units industry for a modular assembly capable of convenient transport, and ready for easy assembly by as little as one person with no special tools or equipment, and fully equipped with utilities necessary to properly, and immediately, house occupants. The building unit need be large enough to occupy as a dwelling, yet compact and portable enough to be transported to and set up on many different locations. The building unit also need be equipped with utility connections to immediately take advantage of water, sewer, and electrical utilities.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

One aspect of the present invention provides a modular assembly with an automated erection system capable of converting from a shipping container configuration into a building unit with utility connections, and from a building unit into a shipping container. The automated erection system may be pre-programmed with the automatic sequence. From the shipping container configuration, a plurality of frame panels and unit panels are selectively positioned to form the floors, walls, and ceilings of the building unit configuration thereby forming a living and/or commercial structure complete with electrical, water and sewage connections. The building unit can then also be folded and converted back by the automated erection system by a substantially reverse process into the shipping container configuration for transport to and from various sites.

The automated erection system may include a system of electric motors, gears, pulleys, cables, automated mechanical arms and electronic controls, located within the container structure of the modular assembly and which interact with the plurality of frame panels and unit panels to deploy and retract the plurality of frame panels and unit panels for constructing the shipping container configuration and the building unit configuration. Thus, the modular assembly may be selectively disposed and oriented into either a shipping container configuration or a building unit configuration via the automated erection system, which facilitates the conversion.

As noted above, the building unit configuration is also complete with electrical, water and sewage connections. From the building unit configuration, the unit can be then folded and converted into a shipping container configuration for transport by a variety of appropriate transportation means. Moreover, the modular assembly of the present invention can be stored and/or transported when in the shipping container configuration.

In the various exemplary embodiments of the modular assembly, both the shipping container and the building unit configurations comprise a frame at least partially defined by a plurality of support members, interconnected by cross braces or the like, and that form a box-like or other appropriate shape. The support members and cross braces preferably comprise elongated, relatively high strength material members preferably, but not exclusively, in the form of steel rectangular tubes welded together to collectively comprise the stable, rigid frame.

Within the support members located on each corner of the modular assembly, extensible columns operated by automated electromechanical actuators lift and level the modular assembly raising it, preferably, at least eighteen inches off the ground and adapting it to a variable topography site such that the bottom panel (i.e., the floor of the building unit) is level. Each extensible column can be independently adjusted to adapt its height to fit the terrain. Thus, the modular assembly can be leveled without modifying the land itself, leaving the land in its original state.

A plurality of pressure pads are located underneath the columns, connected to the ends of the extensible columns, to distribute the weight of the modular assembly and to prevent the columns from sinking into the soil. Again, not only do the pressure pads help to keep the modular assembly level, but also reduces any damage to the land. It is preferable that only four extensible columns with pressure pads be used such that the impact on the land is reduced.

Once the modular assembly having a shipping container configuration is located at a construction or assembly site and the extensible columns are locked into their extended positions, the modular assembly is ready for disposition into the building unit configuration. Accordingly, the modular assembly of the present invention includes a plurality of frame panels as well as a plurality of unit panels each at least initially disposed in a closed orientation on or within the box-like frame. In at least one exemplary embodiment the frame panels and unit panels are formed from a load-bearing material such as corrugated steel or other appropriate material.

The plurality of frame panels include at least one but preferably two side panels each of which may define the "long sides" of the frame when in the shipping container configuration. These frame panels, may also define the side floor portions of the building unit configuration when so assembled (to be described later). Accordingly, the one or more frame panels are pivotally or hingedly attached along their lower most longitudinal (i.e., horizontal) end to the frame and are selectively positioned or pivoted outwardly therefrom in a downward direction to rest in a substantially horizontal position. These frame panels are lowered (or raised) by a plurality of cables of the automated erection system. When in the intended operative position, the frame panels define the floor portions of the building unit configuration.

In addition to the above, the modular assembly further comprises a plurality of unit panels at least some of which are movably connected to the frame and initially disposed on the interior thereof when the modular assembly is in the shipping container configuration.

A first set of the plurality of unit panels are exposed after the frame panels are deployed from their shipping container configuration. The first set of the plurality of unit panels are pivotally or hingedly attached along their upper most longitudinal (i.e., horizontal) end to the frame and are selectively positioned or pivoted outwardly therefrom in an upward direction to rest in a substantially horizontal position, into a position which overlies the floor portion defined by the aforementioned frame panels. Thus, when deployed, the first set of the plurality of unit panels form a ceiling portion of the building unit configuration. The first plurality of unit panels are raised (or lowered) by a plurality of automated mechanical arms which are controlled by a plurality of cables of the automated erection system.

Further, each of the side panels of the plurality of frame panels include panel segments initially disposed in overlying confronting relation to respective ones of the frame panels. The panel segments of corresponding ones of the frame panels or side panels are hingedly or pivotally attached at the outer longitudinal edge of the frame panel (i.e., at the upper most longitudinal end of a frame panel when positioned in the shipping container configuration) so as to extend outwardly in an upward direction from the corresponding frame panels into a substantially upright (i.e., vertical) position. The panel segments are raised (or lowered) by a plurality of cables of the automated erection system. Further, when erected to the substantially upright position, a longitudinal edge or portion of the now upright panel segments are connected to and support a corresponding outer longitudinal edge of the first set of the plurality of unit panels.

In one exemplary embodiment, the first set of unit panels are deployed before the deployment of the panel segments to their upright position.

As such each of the combined or directly associated frame panels and panel segments collectively define a corresponding floor portion and long sidewall portion of the building unit configuration. Furthermore, the first set of the plurality of unit panels define a corresponding ceiling portion supported by the long sidewall portion of the building unit configuration (i.e., by the uprighted panel segments).

Additional ones of the plurality of unit panels (i.e., a second set of the plurality of unit panels) may also be movably connected to the frame and are at least initially disposed on the interior thereof when the modular assembly is in the shipping container configuration. In particular, the second set of the plurality of unit panels are exposed after the first set of the plurality of unit panels are deployed from their shipping container configuration. In at least one exemplary embodiment the second set of the plurality of unit panels may be pivotally or hingedly connected along a latitudinal (i.e., vertical) edge or side thereof to the frame structure (e.g., to a support member of the frame structure) and may extend outwardly so as to respectively define front wall portions and rear wall portions of the building unit configuration. The second set of the plurality of unit panels are rotated outward by means of electromechanical actuators of the automated erection system to assume their positions as front wall and rear wall portions of the building configuration.

Dependent on the overall dimensions and configuration of the building unit configuration the location and relative dimensions of the "long sidewalls" and front and rear "end walls" may vary.

From the building unit configuration, the modular assembly can be converted back into the shipping container configuration by a substantially reverse automated process to that of converting the modular assembly form the shipping container configuration to the building unit configuration.

In order to facilitate the disposition of the modular assembly into either the building unit configuration or the shipping container configuration, the automated erection system is provided. The automated erection system performs an automatic, pre-programmed sequence, by way of electric motors, gears, pulleys, cables, automated mechanical arms and/or electronic controls to convert the modular assembly between the two configurations. The pre-programmed sequence may be stored in a computer-readable medium and operated by a control processing unit. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like.

The automated erection system comprises at least three subsystems which are all located within the container structure above what would constitute the ceiling of the building assembly. The three subsystems are conceptually identical mechanisms that may vary on the power of the electrical motors that drive them.

For example, the first mechanism operates a first plurality of cables that are released or retrieved by means of a combination of pulleys that are attached to a pulley carriage that is displaced along a pair or rails by means of a linkage to a threaded bar. The threaded bar is rotated by a combination of gears and a direct current 12 volt electric motor that can rotate bi-directionally. Depending on the operation, the motor will rotate clockwise or counterclockwise. As the motor rotates, the motor turns the threaded bar and the pulley carriage, which moves along the threads of the threaded bar, moves as the threaded bar turns. As the pulley carriage moves up or down the threaded bar, the cables attached thereto are released or retrieved accordingly.

Similarly, the second mechanism having a similar mechanism as the first mechanism having another combination of pulleys that are attached to another pulley carriage that is displaced along another pair or rails by means of a linkage to another threaded bar operates a second plurality of cables which in turn operate a plurality of automated mechanical arms, respectively. In particular, the cables are attached to automated mechanical arms to lift the arms up and down as will be described later. This mechanism is also bi-directional.

The third mechanism operates a third plurality of cables in a similar manner, having another combination of pulleys that are attached to another pulley carriage that is displaced along another pair or rails by means of a linkage to another threaded bar to operate a third plurality of cables. This mechanism is also bi-directional.

The automated erection system may include a processor which processes the pre-programmed sequence and controls the three subsystems according thereto.

In addition, on a "front short end" of the container configuration two entry panels are respectively hinged to the body of the container. In particular, a lower most longitudinal end of a first entry panel is pivotally or hingedly attached to the frame and is selectively positioned or pivoted outwardly therefrom in a downward direction to rest in a substantially horizontal position to constitutes an entry porch. Also, an upper most longitudinal end of a second entry panel is pivotally or hingedly attached to the frame and is selectively positioned or pivoted outwardly therefrom in an upward direction to rest in a substantially horizontal position which overlies the entry porch defined by the first entry panel. Thus, when deployed, the second entry panel constitutes a canopy for the entry. The two entry panels can be "manually" deployed with the assistance of pneumatic pistons. According to one exemplarily embodiment, access is gained to the control panel from where the automated sequence is initiated once the two entry panels are deployed. When the two entry panels are deployed, an entrance disposed in the "front short end" is exposed.

The modular assembly may further comprise at least one interior partition that is preferably in a fixed position within the frame when the unit arrives on site in its shipping container configuration. An additional partition can be added, by way of example only, by installing an included partition panel assembly in order to define the interior "rooms" or space within the building unit configuration. The partition panel system can be unfolded and secured to the floor, to the interior of the building unit side wall, and to the at least one fixed partition, as set forth above.

In addition, cabinets can be positioned in a kitchen area using tracks installed on the kitchen walls. A water heater can be installed using pre-existing utility pipes in the modular assembly. Kitchen appliances and restroom fixtures such as sinks, toilets, oven and stove units, and refrigerators can be installed into the building unit during assembly. The building unit arrives on site equipped with both interior and exterior connections for water, sewer, and electrical utilities. Furthermore, doors and windows can be installed into the frame and one or more of the frame or unit panels. Also, one or more doors may be pre-installed into the front or other portions of the modular assembly and windows may also be installed in appropriate locations.

BRIEF DESCRIPTION OF THE DRAWINGS

The above and other aspects of the present invention will become more apparent from the following description of exemplary embodiments, taken in conjunction with the accompanying drawings of which:

FIG. 23 is a perspective view of a foundation slab used for supporting modular assemblies according to an exemplary embodiment;

FIG. 24 is a perspective view of an exemplary embodiment of the modular assembly connected to the foundation slab shown in FIG. 23;

Throughout the drawings, the same drawing reference numerals will be understood to refer to the same elements, features, and structures.

DETAILED DESCRIPTION OF THE EXEMPLARY EMBODIMENTS

The matters defined in the description such as a detailed construction and elements are provided to assist in a comprehensive understanding of the embodiment of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
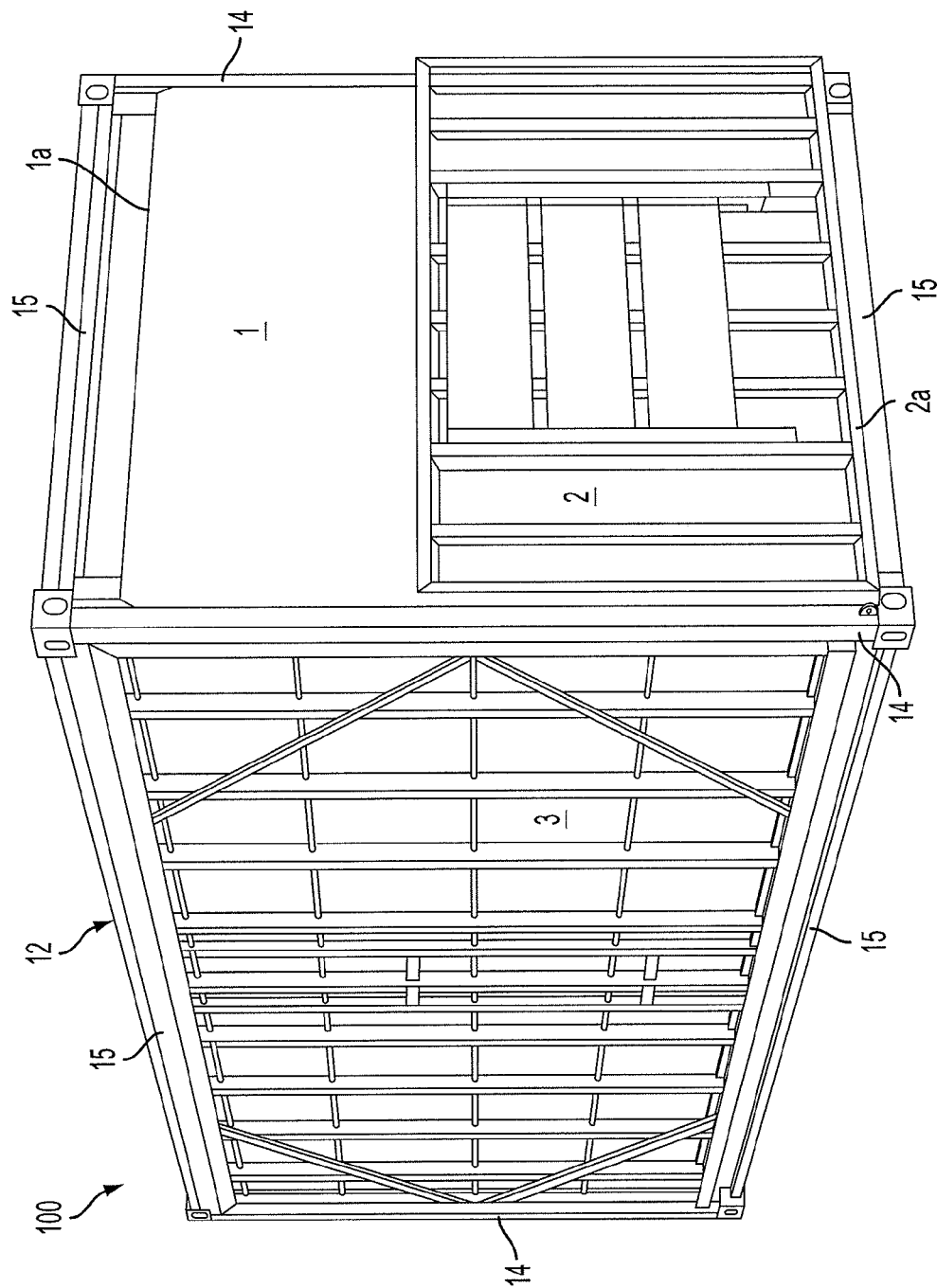
FIG. 1 is a perspective view of an exemplary embodiment of the modular assembly in a shipping container configuration.
Figure 13:
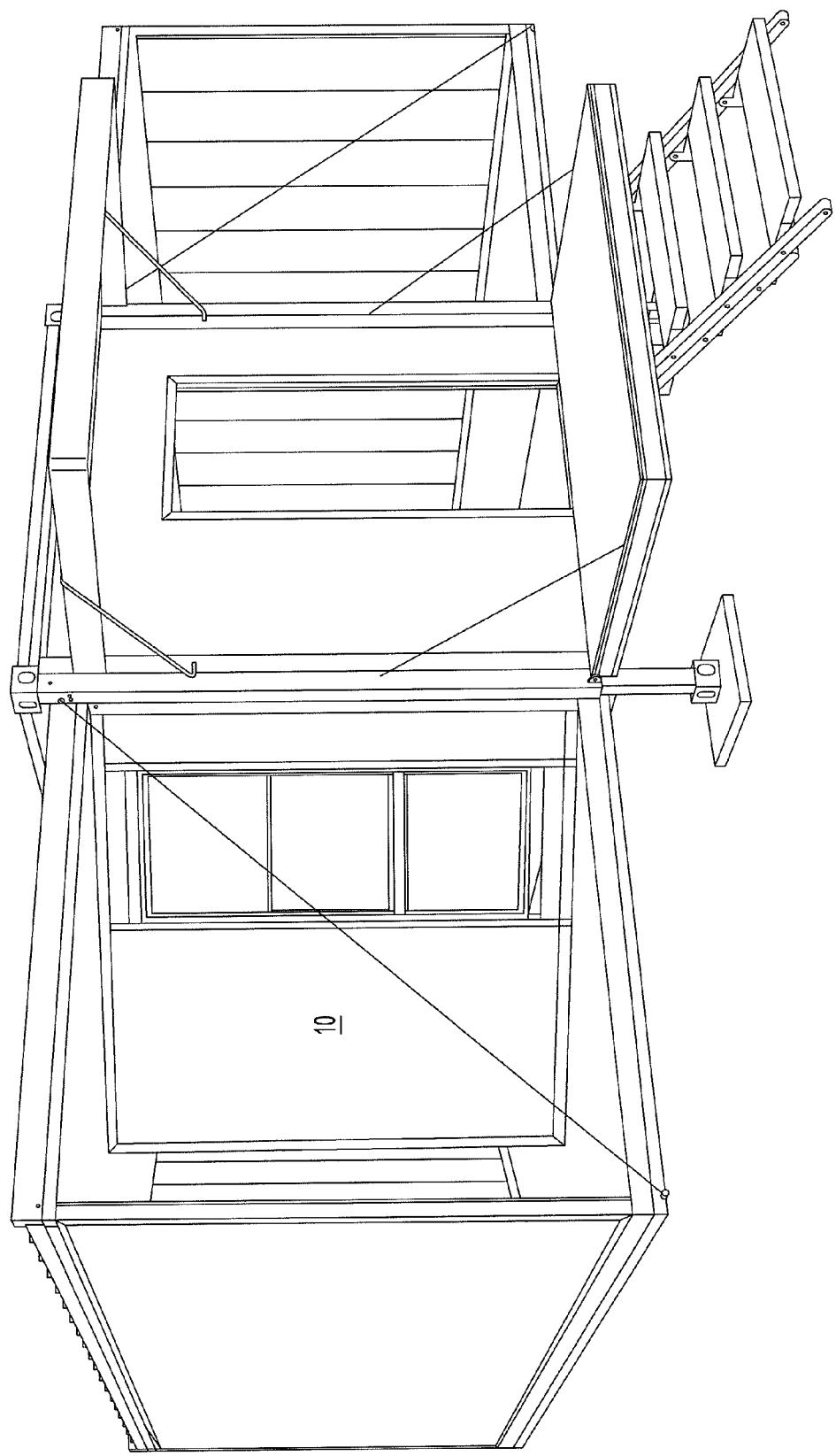
FIG. 13 is a perspective view of the exemplary embodiment of FIGS. 1 through 12 in yet another successive phase of assembly into the building unit configuration.
Figure 14:
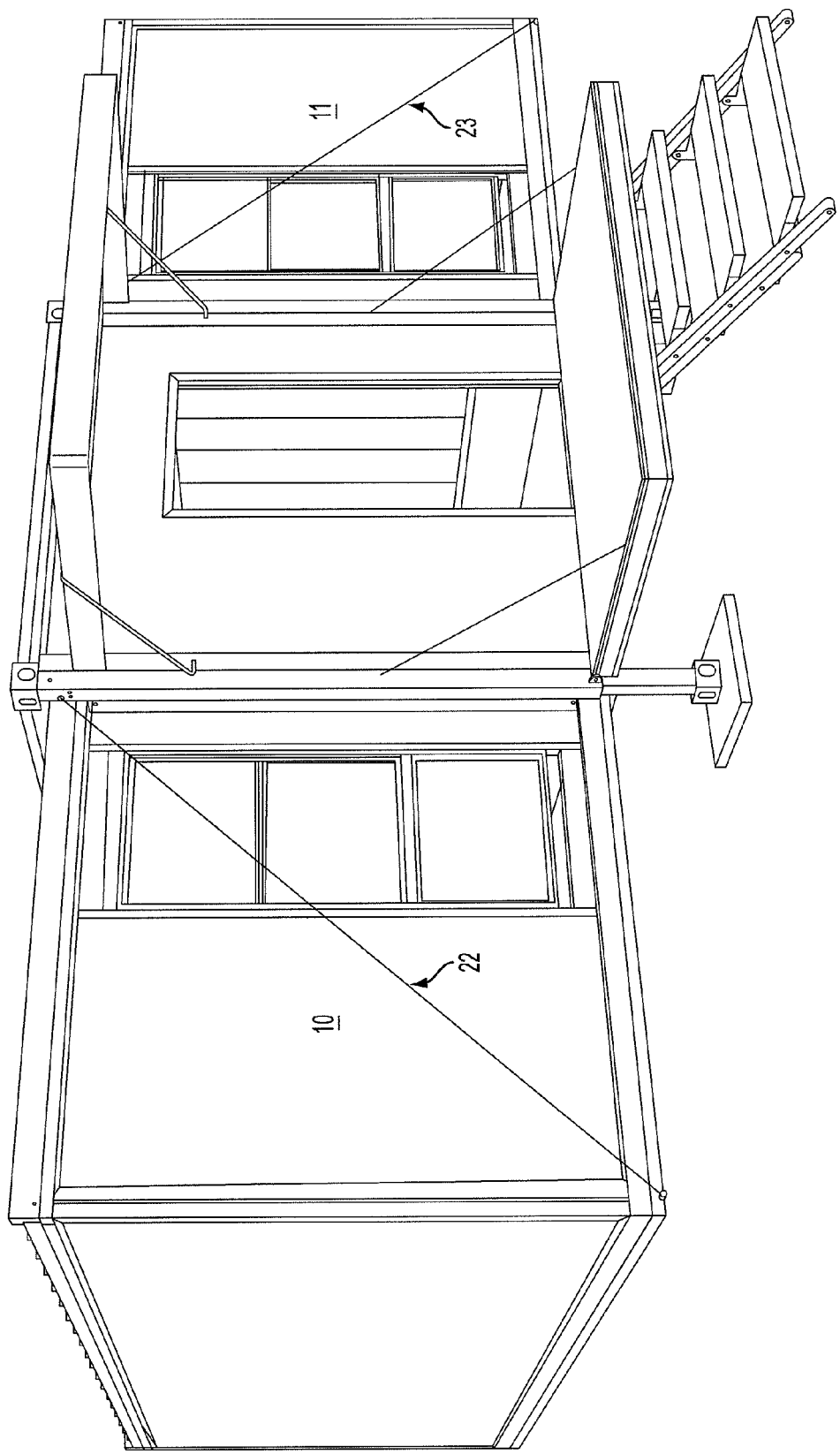
FIG. 14 is a perspective view of an exemplary embodiment of the modular assembly in a building unit configuration.
Figure 15:
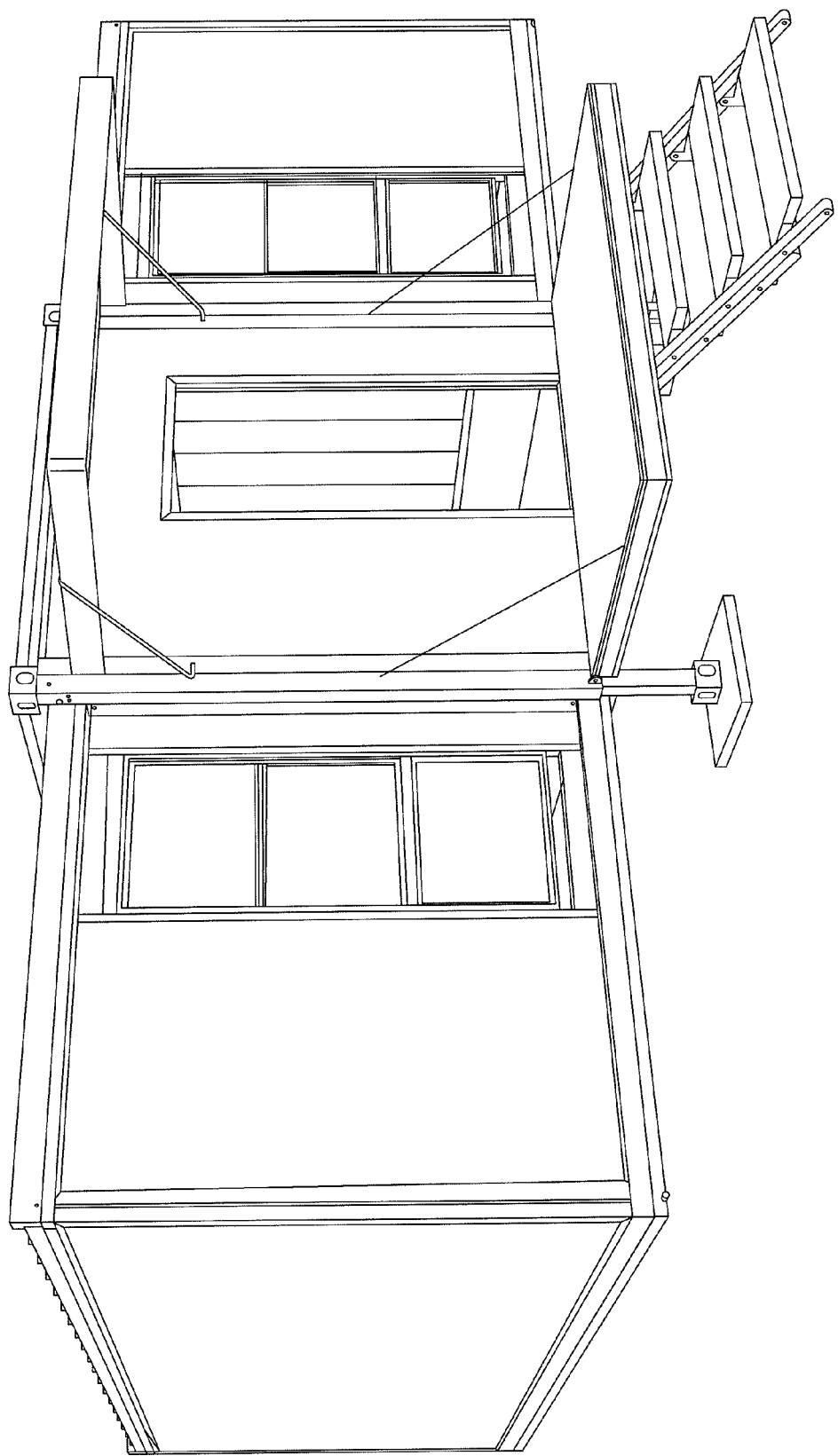
FIG. 15 is another perspective view of the exemplary embodiment of the modular assembly in a building unit configuration.

As shown in the accompanying FIGS. 1 through 15, the modular assembly of the present invention is generally indicated as 100 and is structured to assume either a shipping container configuration as represented in FIG. 1 or an assembled building unit configuration as represented in FIGS. 14 and 15. When in the building unit configuration, the modular assembly 100 can be used either as a living unit, commercial unit, or other facilities, wherein one or more individuals can occupy the modular assembly 100 and perform any of a variety of different functions.

Accordingly, the modular assembly 100 includes a frame generally indicated as 12 including a plurality of at least four support members 14 interconnected by cross braces or like additional support structures 15. The support members 14 as well as the cross braces 15 may be made of a high strength material such as, but not limited to, tubular steel or other appropriate materials welded or otherwise interconnected to one another to form a box-like configuration as represented throughout the various Figures.

Figure 2:
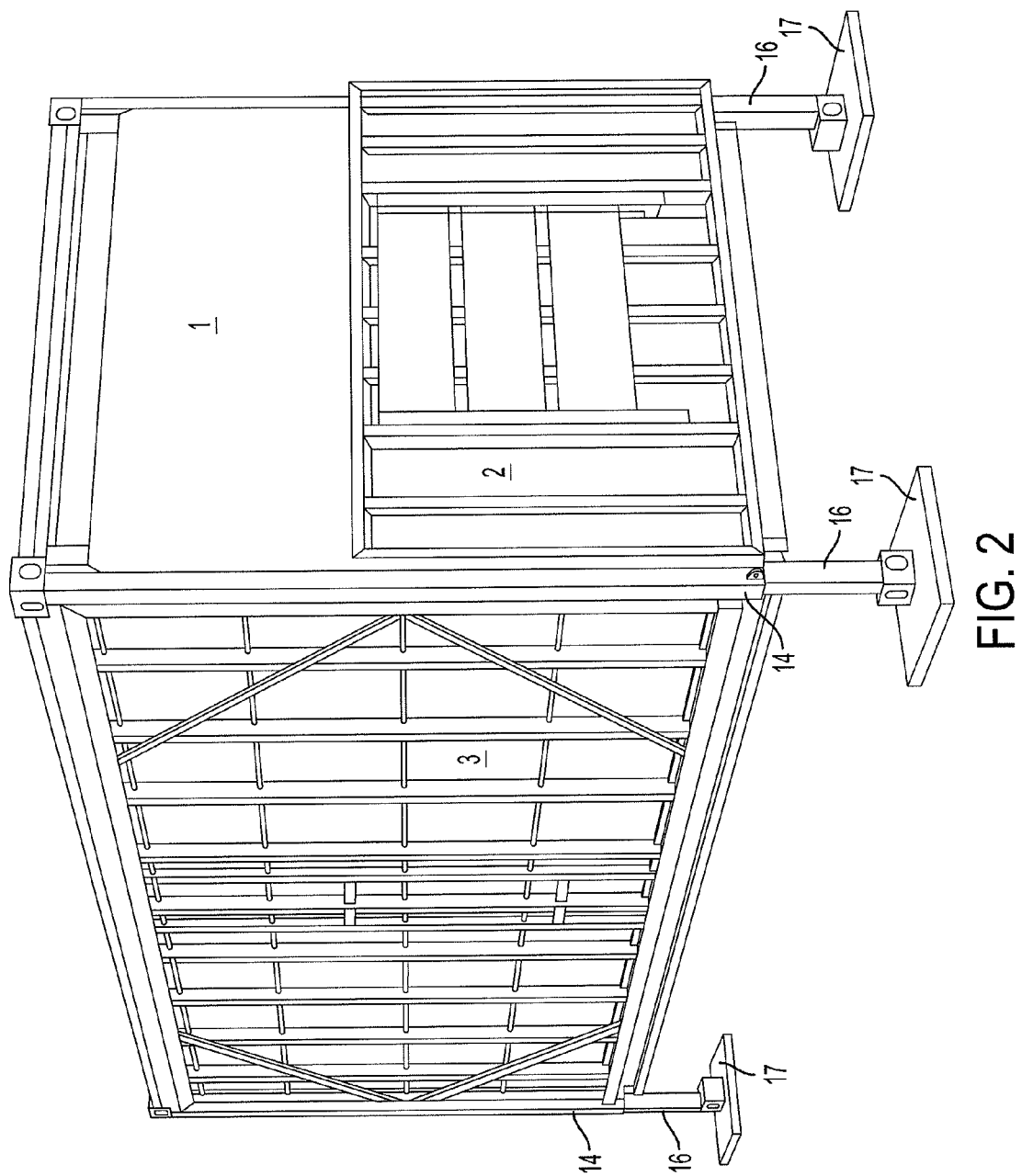
FIG. 2 is a perspective view of the exemplary embodiment of FIG. 1 in a successive step of assembly from the shipping container configuration to a building unit configuration.
Figure 3:
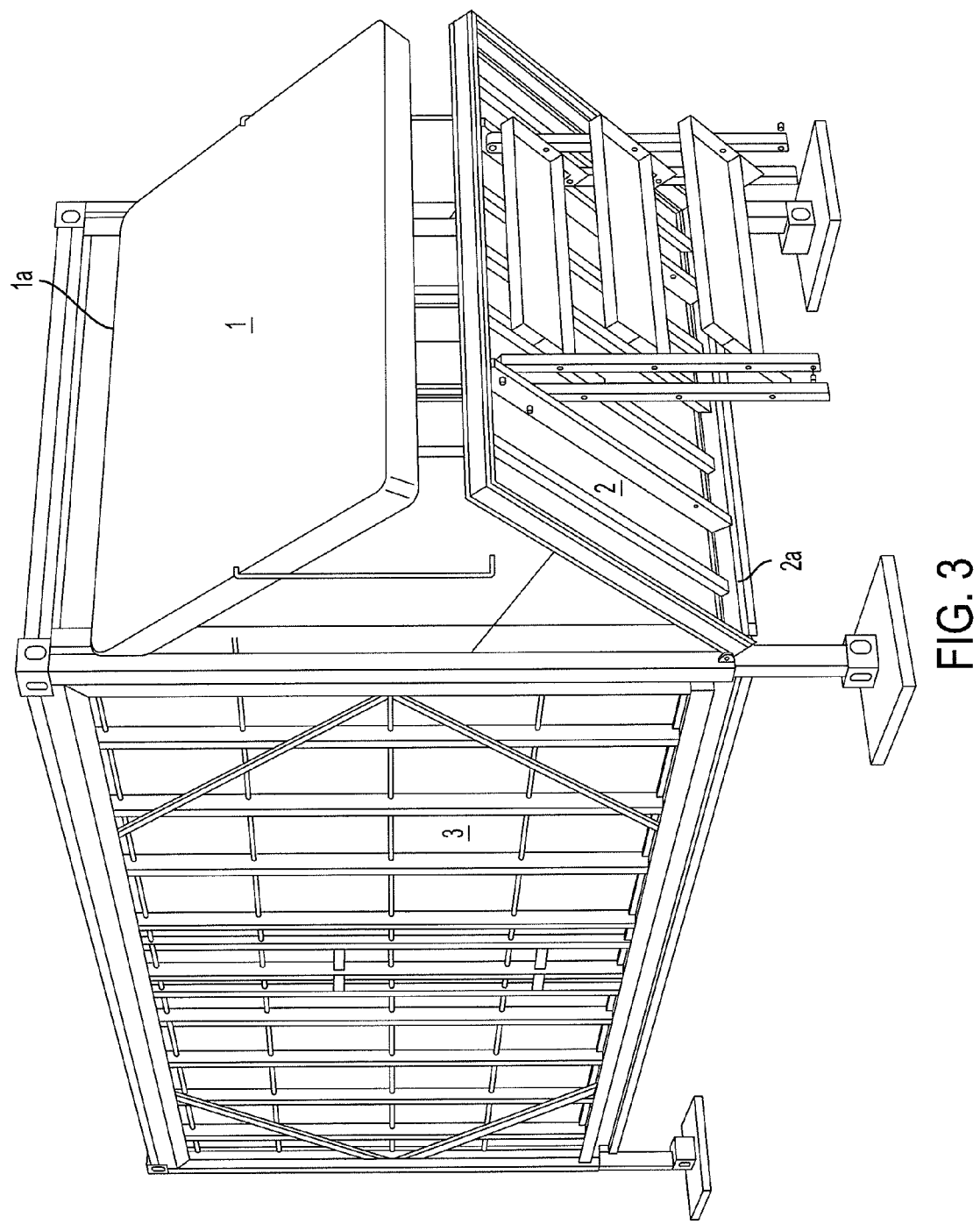
FIG. 3 is a perspective view of the exemplary embodiment of FIGS. 1 and 2 in yet another successive step of assembly from the shipping container configuration to a building unit configuration.
Figure 16:
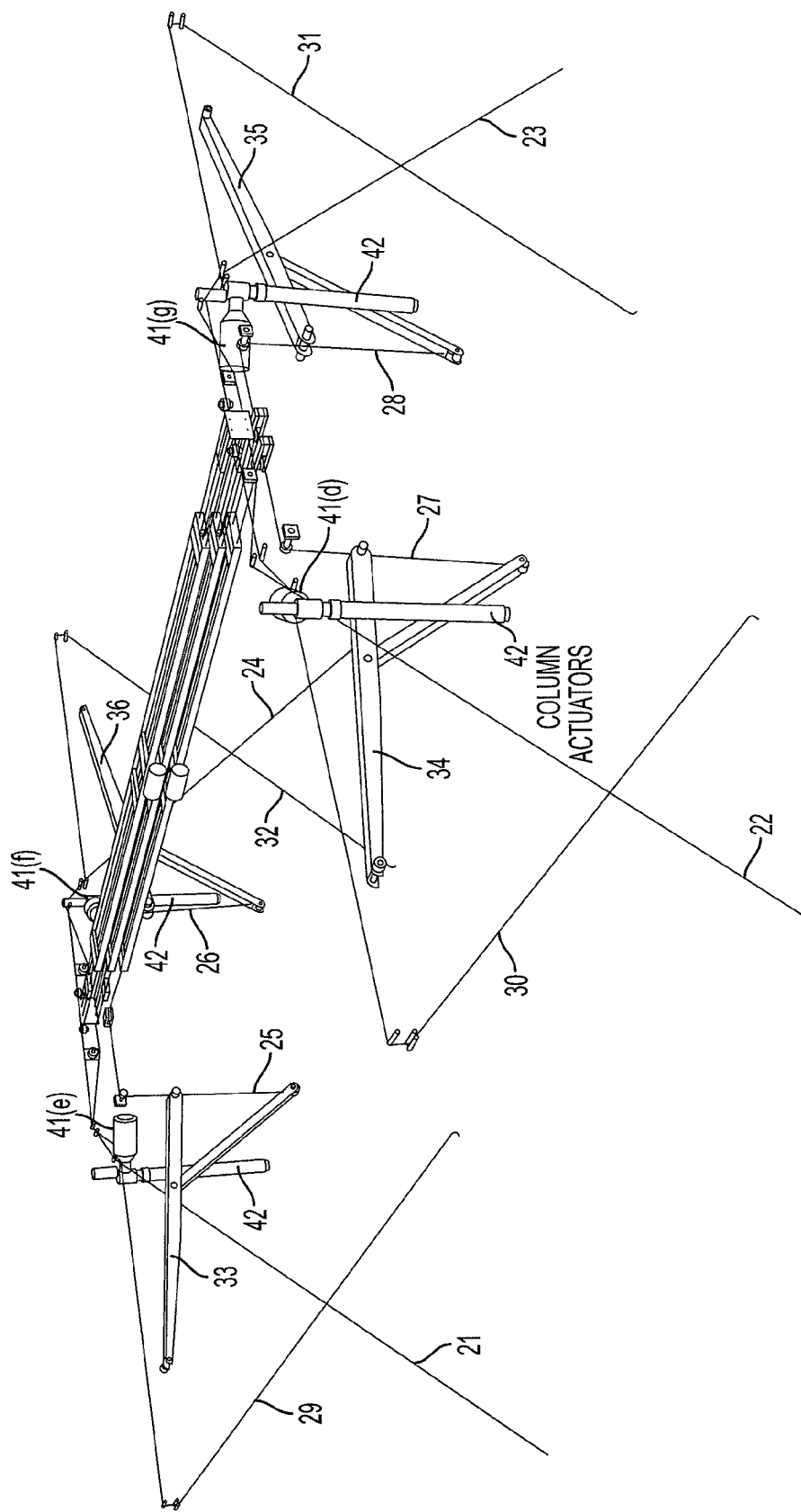
FIG. 16 is a perspective view of an exemplary embodiment of an erection system having three subsystems.

As will be explained in greater detail hereinafter, the modular assembly includes a plurality of frame panels and a plurality of unit panels movably connected to the frame 12 and/or to one another and selectively positionable into a closed position, as represented in FIGS. 1 and 2, or an opened position as represented in FIGS. 3 through 15. The structural and operative details of both the frame panels and the unit panels will be more fully described. However, in order to properly position at least the frame panels, and possibly at least some of the plurality of unit panels, the modular assembly of the present invention also includes an automated erection system, as shown in FIG. 16.

The automated erection system performs an automatic, pre-programmed sequence by way of electric motors, gears, pulleys, cables, automated mechanical arms and electronic controls to convert the modular assembly between the two configurations.

Figure 17:
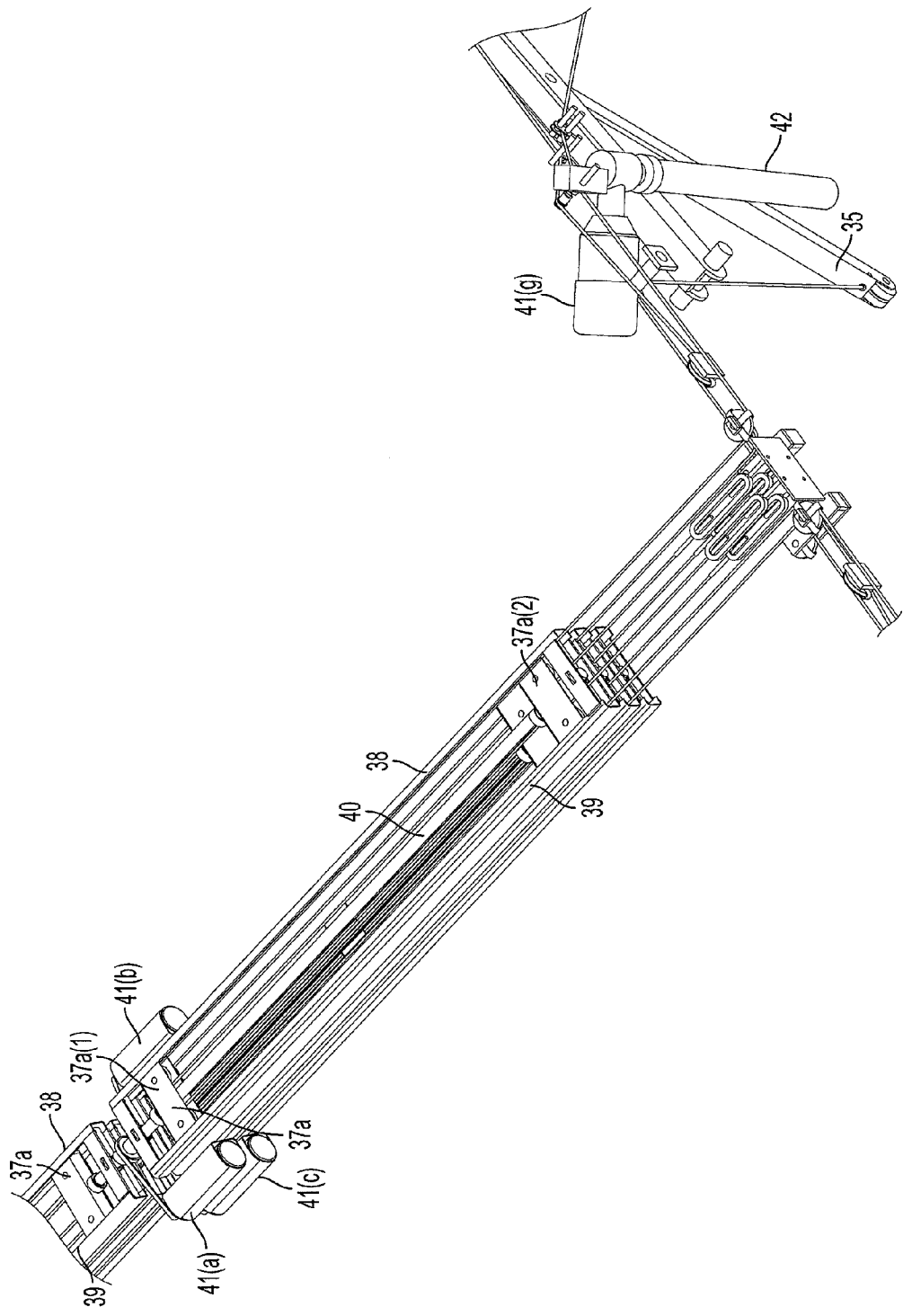
FIG. 17 is another perspective view of the exemplary embodiment of the erection system having three subsystems.

The automated erection system comprises at least three subsystems (to be described later) which are all located within the container structure above what would constitute the ceiling of the building assembly. As shown in FIGS. 16 and 17, the three subsystems are stacked on top of one another. The three subsystems are conceptually identical mechanisms that may vary on the power of the electrical motors that drive them.

According to FIG. 1, the modular assembly includes on the "front short end" of the shipping container configuration two entry panels identified as 1 and 2, and includes on the "long side" of the shipping container configuration a frame panel 3. The entry panels 1 and 2 are respectively hinged to the cross braces 15 of the body of the frame 12. In particular, as shown in FIGS. 1-4, a lower most longitudinal end 2a of entry panel 2 is pivotally or hingedly attached to the frame and is selectively positioned or pivoted outwardly therefrom in a downward direction to rest in a substantially horizontal position to constitutes an entry porch. Also, an upper most longitudinal end 1a of entry panel 1 is pivotally or hingedly attached to the frame and is selectively positioned or pivoted outwardly therefrom in an upward direction to rest in a substantially horizontal position which overlies the entry porch defined by the entry panel 2. Thus, when deployed, the entry panel 1 constitutes a canopy for the entry. The two entry panels can be "manually" deployed in a controlled rate with the assistance of pneumatic pistons, spring loaded jack springs, or the like.

According to one exemplarily embodiment, access is gained to the control panel from where the automated sequence is initiated once the two entry panels are deployed. When the two entry panels are deployed, an entrance disposed in the "front short end" is exposed.

As shown in FIG. 2, within the support members 14 located on each corner of the frame 12 of the modular assembly 100 are extensible columns 16 operated by automated electromechanical actuators which lift and level the modular assembly 100, raising it, preferably, at least eighteen inches off the ground and adapting it to a variable topography site such that the bottom panel (i.e., the floor of the building unit) is level. Thus, the height of each extensible column 16 is adjusted independently such that the structure can be leveled by way of the columns 16 instead of leveling the terrain itself. A plurality of pressure pads 17 are located underneath the support members 15, connected to the ends of the extensible columns 16, to distribute the weight of the modular assembly 100 and prevent the extensible columns 16 from sinking into the soil. Not only do the pressure pads 17 help to keep the modular assembly level, but also reduces any damage incurred to the land. It is preferable that only four extensible columns with pressure pads are used such that the impact on the land is reduced further. Motors 41(d), 41(e), 41(f) and 41(g), which are coupled to electromechanical column extension actuators 42 (shown in FIGS. 16 and 17) provide height adjustment of the extensible columns 16.

Figure 4:
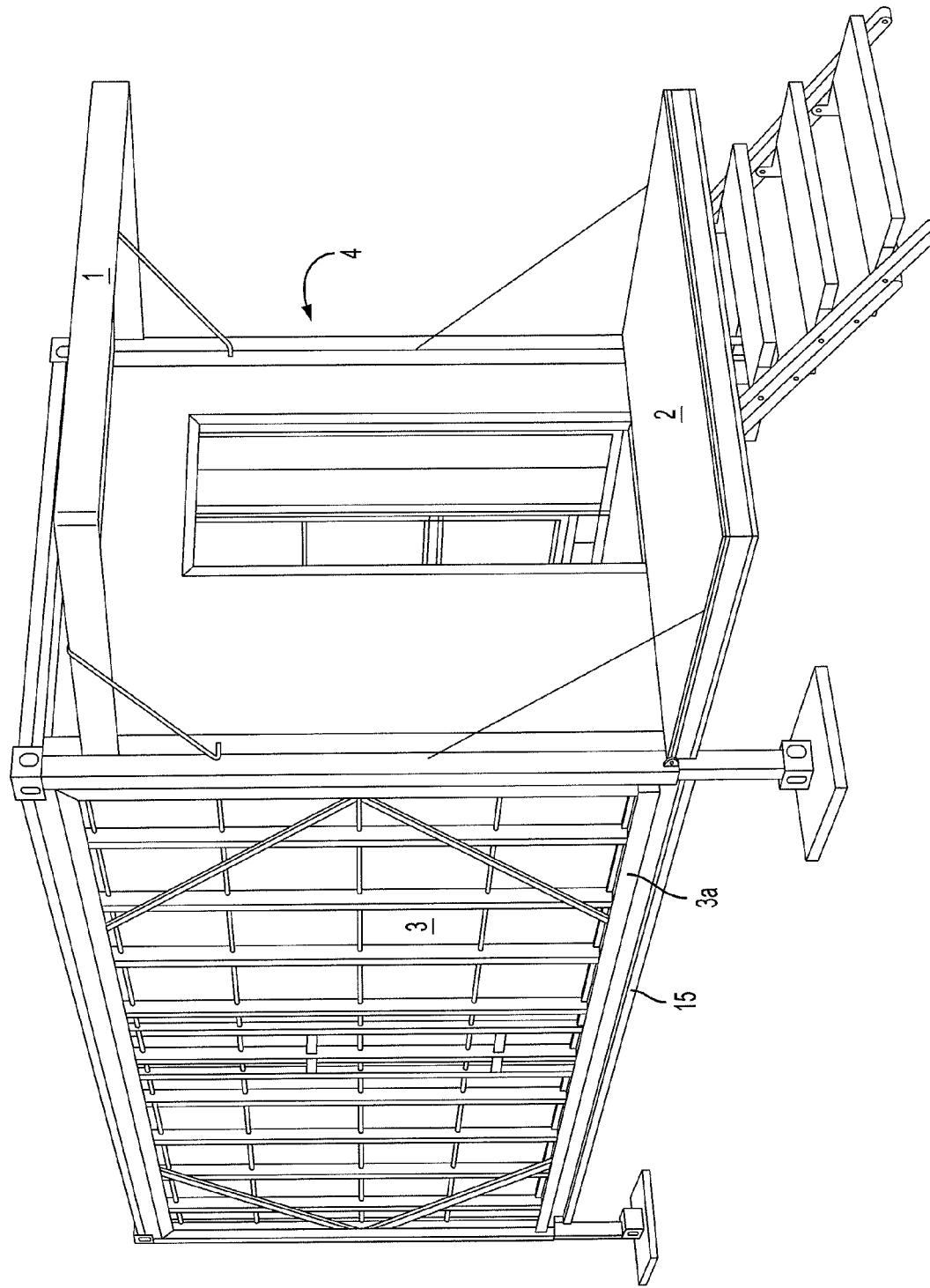
FIG. 4 is a perspective view of the exemplary embodiment of FIGS. 1 through 3 in yet another successive phase of assembly into the building unit configuration.
Figure 5:
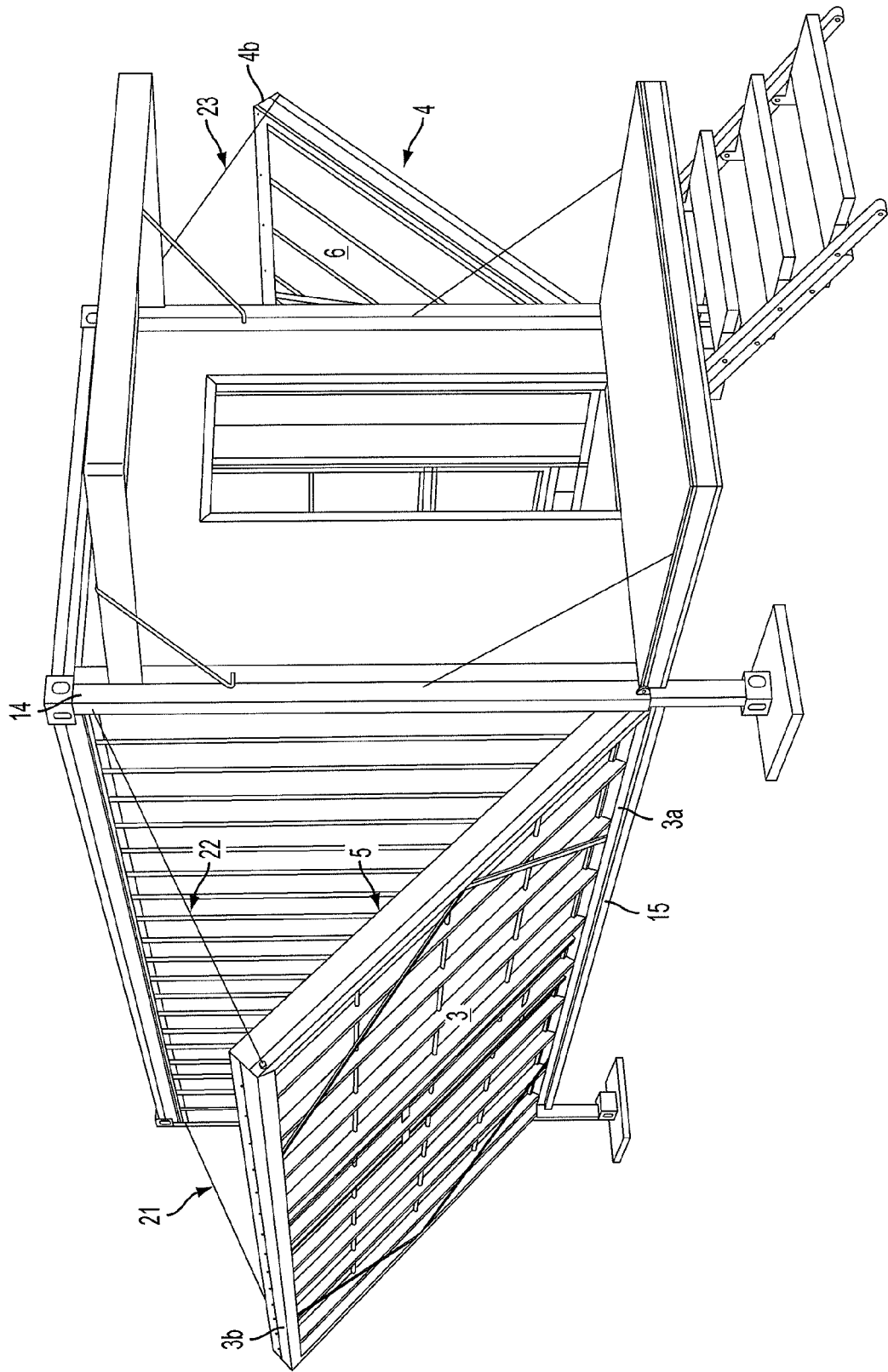
FIG. 5 is a perspective view of the exemplary embodiment of FIGS. 1 through 4 in yet another successive phase of assembly into the building unit configuration.
Figure 6:
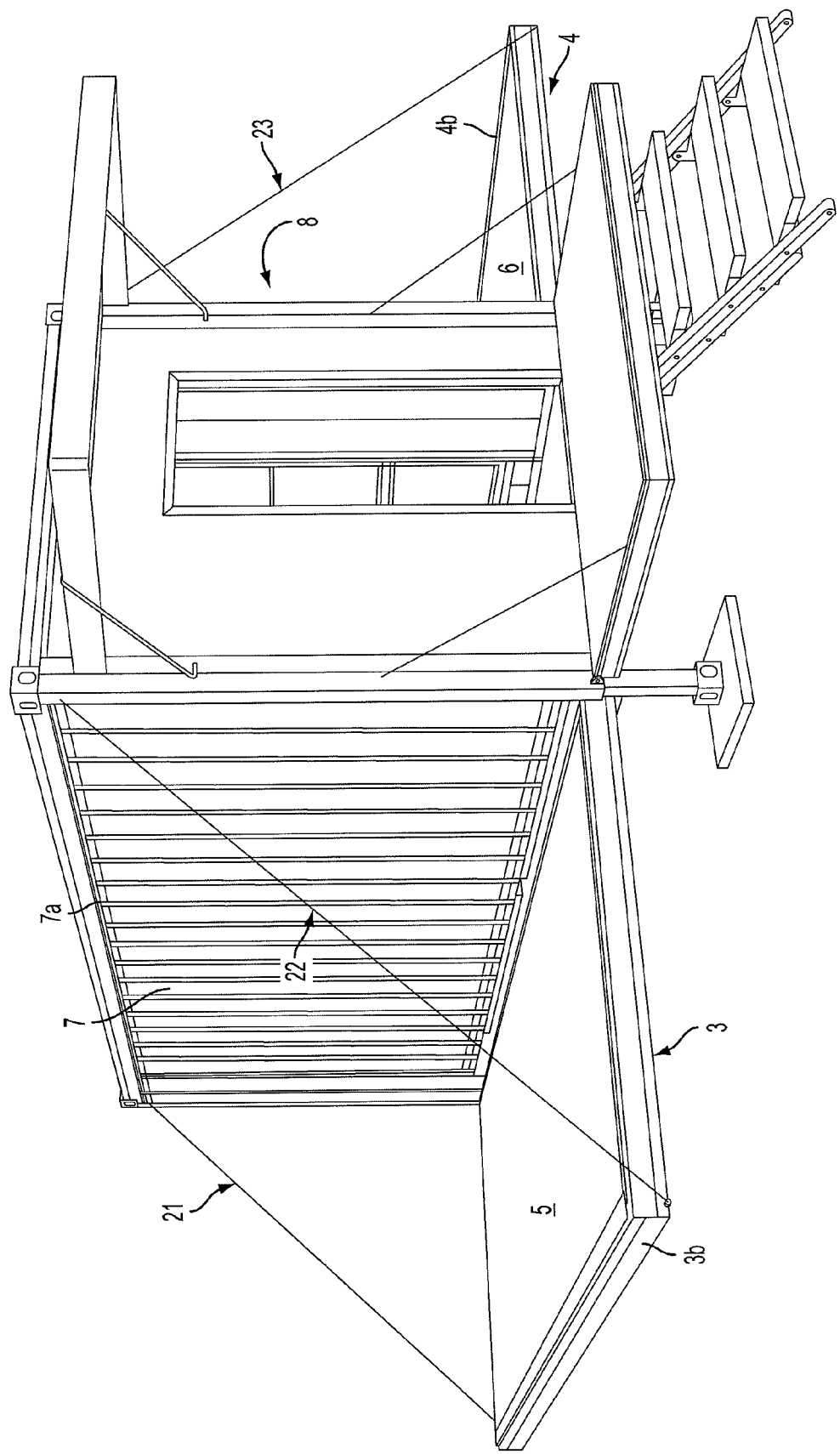
FIG. 6 is a perspective view of the exemplary embodiment of FIGS. 1 through 5 in yet another successive phase of assembly into the building unit configuration.

As shown in FIGS. 4-6, once the container is raised and leveled by the extensible columns 16, frame panels 3 and 4, which define the outer "long sides" of the frame when the modular assembly 100 is in the shipping container configuration, are released from their upright position and are lowered by means of cables 21, 22, 23 and 24 (cable 24 not shown in FIGS. 4-6) by the automated erection system. When fully deployed, the frame panels 3 and 4 make up two floor portions of the building unit configuration, as shown in FIG. 6.

In particular, frame panels 3 and 4 are pivotally or hingedly attached along their lower most longitudinal (i.e., horizontal) end 3a and 4a (4a not shown) respectively, to the frame 12 and are selectively positioned or pivoted outwardly from their upright position in a downward direction to rest in a substantially horizontal position. These frame panels 3 and 4 are lowered (or raised) by a plurality of cables 21, 22, 23, 24 attached at one end to upper most longitudinal end 3b and 4b of the frame panels 3 and 4. Cables 21, 22, 23 and 24 are fed through a hole in a corresponding support member 14 and are coupled to a pulley carriage 37a (see FIG. 17 where 37a(1) shows the pulley carriage 37a in a retracted position and 37a(2) shows the pulley carriage 37a in a released position) of the automated erection system disposed within the container structure above what would constitute the ceiling of the building assembly (see also FIG. 16).

Figure 18:
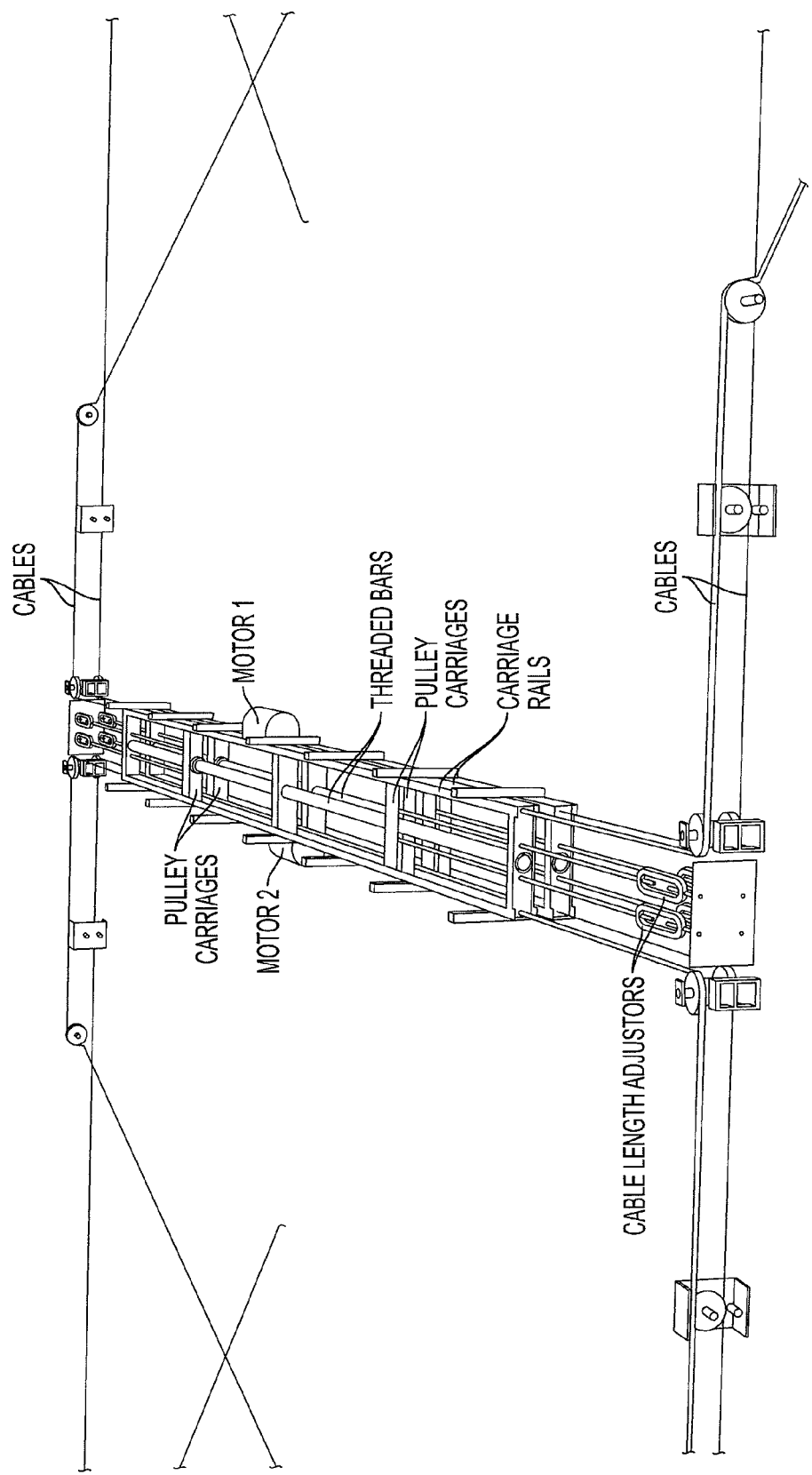
FIG. 18 is another a perspective view of the exemplary embodiment of the erection system, showing only two of the three subsystems.

A first mechanism of the automated erection system operates cables 21, 22, 23 and 24. As shown in FIGS. 16-18, cables 21, 22, 23 and 24 are released or retrieved by means of a combination of pulleys that are attached to the pulley carriage 37a that is displaced along a pair or rails 38 and 39 by means of a linkage to a threaded bar 40 (see FIG. 17). In particular, the release and retrieval of cables 21 and 24 are controlled by one pulley carriage 37a and cables 22 and 23 are controlled by another pulley carriage 37a. The threaded bar 40 is rotated by a combination of gears and a direct current 12-volt electric motor 41(a) that can rotate bi-directionally for releasing and retrieving the cables 21, 22, 23 and 24. Depending on the operation, the motor 41(a) will rotate clockwise or counterclockwise. As the motor 41(a) rotates, the motor 41(a) turns the threaded bar 40 and the pulley carriages 37(a), which move along the threads of the threaded bar, move as the threaded bar 40 turns. That is, depending on the operation, the motor 41(a) will rotate clockwise or counterclockwise. As the pulley carriages 37(a) move up or down the threaded bar 40, the cables 21, 22, 23 and 24 attached thereto are released or retrieved accordingly. In particular, when the pulley carriages 37(a) are in near the center of the rail system at position 37a(1), the cables 21-24 are in a "retrieved" position. Alternatively, when the pulley carriages 37(a) are in near the ends of the rail system at position 37a(2), the cables 21-24 are in a "released" position. In order to lower the frame panels 3 and 4, the cables 21-24 are controllably released from the "retrieved" position into the "released" position.

Figure 19:
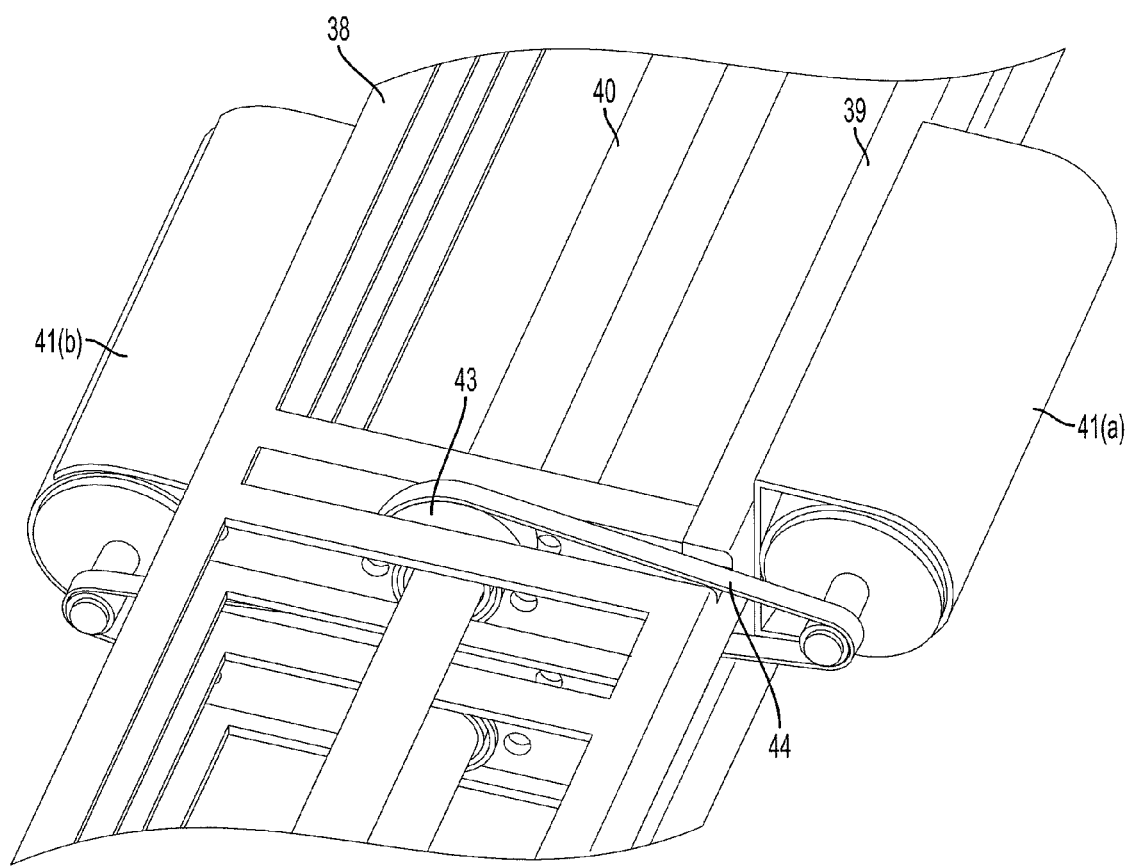
FIG. 19 is a close-up perspective view of the exemplary embodiment of the erection system.

FIG. 19 shows one exemplary embodiment of the motor 41(a) coupled to the threaded bar 40 by a gear 43 and chain 44 used for turning the threaded bar 40.

In addition to the above, the modular assembly further comprises a plurality of unit panels at least some of which are movably connected to the frame 12 and initially disposed on the interior thereof when the modular assembly 100 is in the shipping container configuration.

Figure 7:
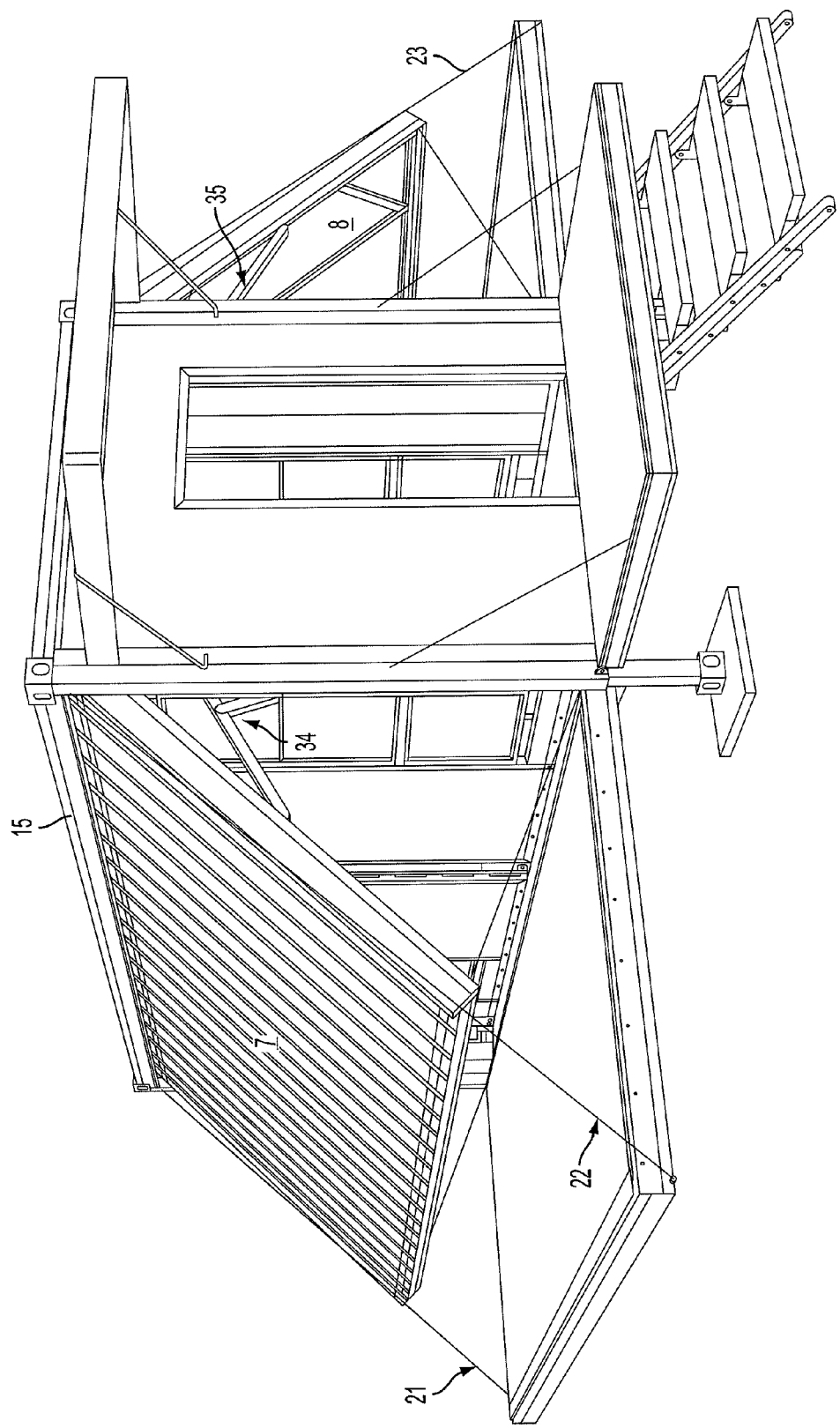
FIG. 7 is a perspective view of the exemplary embodiment of FIGS. 1 through 6 in yet another successive phase of assembly into the building unit configuration.
Figure 8:
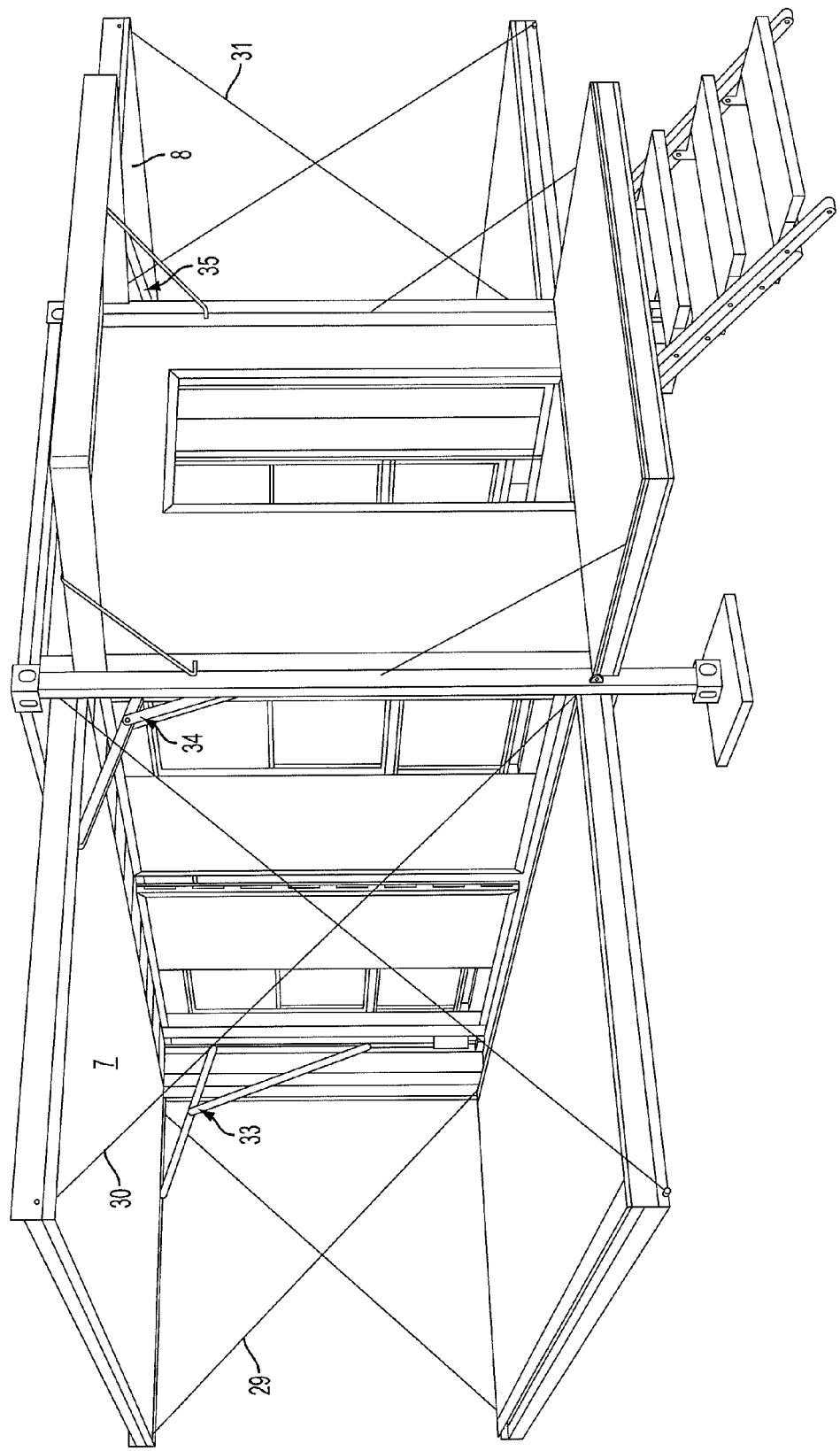
FIG. 8 is a perspective view of the exemplary embodiment of FIGS. 1 through 7 in yet another successive phase of assembly into the building unit configuration.

FIGS. 6-8 show a first set of the plurality of unit panels 7 and 8 which are exposed after the frame panels 3 and 4 are deployed from their shipping container configuration. The first set of the plurality of unit panels 7 and 8 are pivotally or hingedly attached along their upper most longitudinal (i.e., horizontal) end 7a and 8a (8a not shown) to the frame 12 and are selectively positioned or pivoted outwardly therefrom in an upward direction to rest in a substantially horizontal position, into a position which overlies the floor portion defined by the aforementioned frame panels 3 and 4. Thus, when deployed, the first set of the plurality of unit panels 7 and 8 form a ceiling portion of the building unit configuration. The first plurality of unit panels 7 and 8 are raised (or lowered) by a plurality of automated mechanical arms 33, 34, 35 and 36 (mechanical arms 33 and 36 not shown) which are controlled by a plurality of cables of the automated erection system.

In particular, a second mechanism shown in FIGS. 16 and 17 of the automated erection system operates cables 25, 26, 27 and 28 which in turn operate mechanical arms 33, 34, 35 and 36, respectively.

The second mechanism has a similar mechanism as the first mechanism having another combination of pulleys that are attached to another set of pulley carriages 37(b) (not shown) that are displaced along another pair or rails 38 and 39 by means of a linkage to another threaded bar 40 to operate a second plurality of cables 25-28 which in turn operate a plurality of automated mechanical arms 33-36, respectively. In particular, as the motor 41(b) turns the threaded bar 40, the cables 25-28 are retrieved or released in a similar manner as described above in conjunction with the first mechanism. The cables 25-28 are attached to the automated mechanical arms 33-36 to lift the arms up and down (see FIG. 16). In particular, as shown in FIGS. 7, 8 11 and 16, when the pulley carriages 37(b) are moved from a "released" position 37b(2) to a "retrieved" position 37b(1), the mechanical arms 33-36 are pulled upward and are deployed, lifting the unit panels 7 and 8. The mechanical arms 33-36 can be lowered again by moving the pulley carriages 37(b) from the "retrieved" position 37b(1) to the "released" position 37b(2).

Further, each of the side panels of the plurality of frame panels 3 and 4 include panel segments 5 and 6 initially disposed in overlying confronting relation to respective ones of the frame panels 3 and 4. The panel segments 5 and 6, shown in FIGS. 5, 6 and 9-12, of a corresponding one of the frame panels 3 and 4 or side panels are hingedly or pivotally attached at the upper most longitudinal end 3b and 4b of the frame panels 3 and 4 (i.e., at the upper most longitudinal end of a frame panel when positioned in the shipping container configuration) so as to extend outwardly in an upward direction from the corresponding frame panel 3 and 4 into a substantially upright (i.e., vertical) position. The panel segments 5 and 6 are raised (or lowered) by a plurality of cables 29, 30, 31 and 32 of the automated erection system. These cables 29, 30, 31 and 32 are threaded through the panel structure of panels 5, 6, 7 and 8; they are anchored on the corners of frame panels 3 and 4 and pulled by the mechanisms located within the container structure (i.e., by the automated erection system), as shown in FIG. 9.

In particular, a third mechanism of the automated erection system operates cables 29, 30, 31 and 32 (see FIGS. 16-18). The third mechanism is also bi-directional such that the plurality of cables 29, 30, 31 and 32 can be retrieved (to pull the panel segments 5 and 6 to the upright position) and released (to lower the panel segments 5 and 6).

The third mechanism has a similar mechanism as the first and second mechanisms having another combination of pulleys that are attached to another set of pulley carriages 37(*c*) (not shown) that are displaced along another pair or rails 38 and 39 by means of a linkage to another threaded bar 40 to operate a third plurality of cables 29-32. As motor 41(*c*) turns the threaded bar 40, the cables 29-32 are retrieved or released in a similar manner as described above in conjunction with the first and second mechanisms. In particular, the panel segments 5 and 6 are moved to their upright position when the pulley carriages 37(*c*) are moved from a "released" position 37*c*(2) to a "retrieved" position 37*c*(1), and the panel segments 5 and 6 are lowered when the pulley carriages 37(*c*) are moved from the "retrieved" position 37*c*(1) to the "released" position 37*c*(2).

Figure 9:
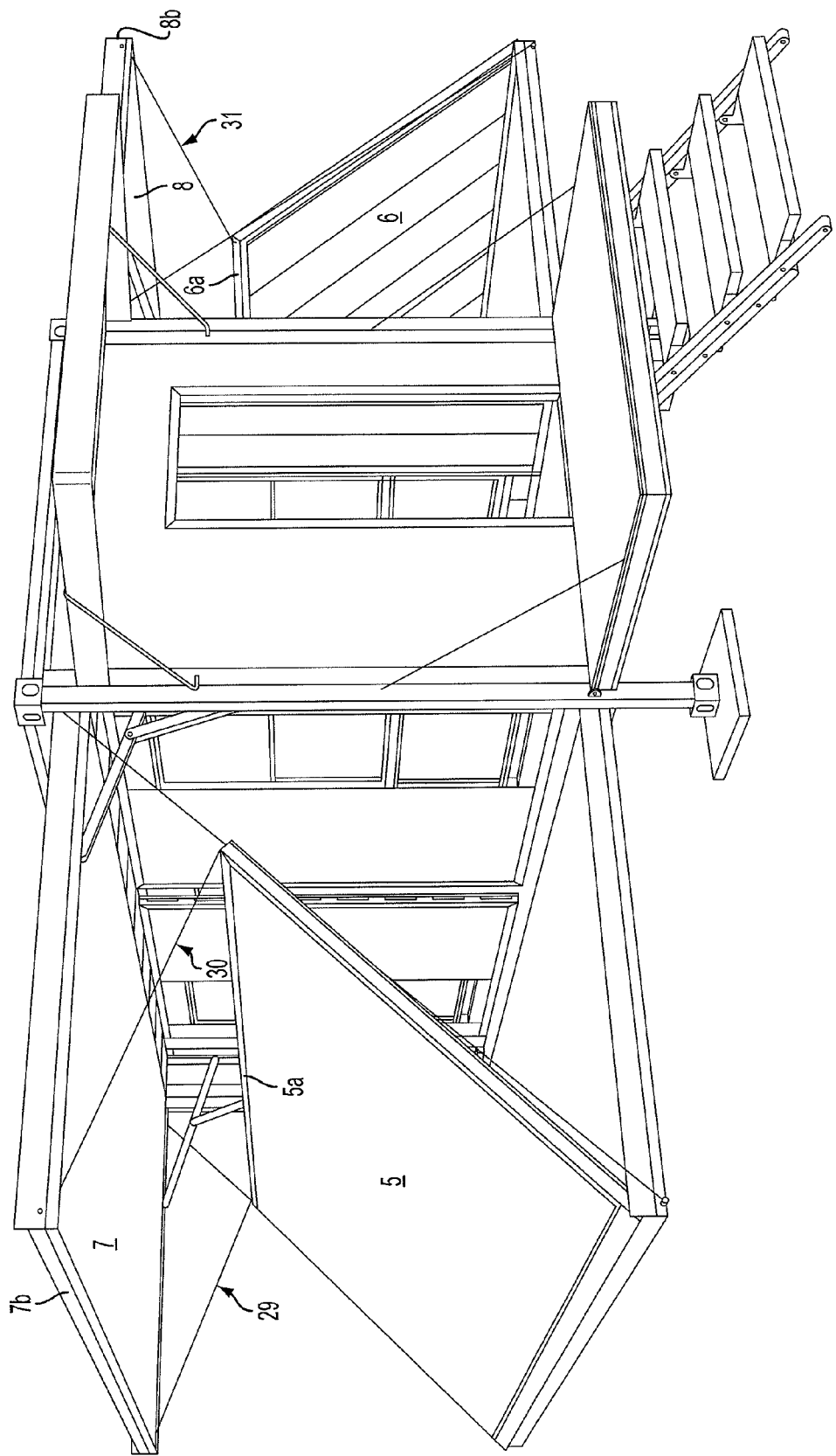
FIG. 9 is a perspective view of the exemplary embodiment of FIGS. 1 through 8 in yet another successive phase of assembly into the building unit configuration.
Figure 10:
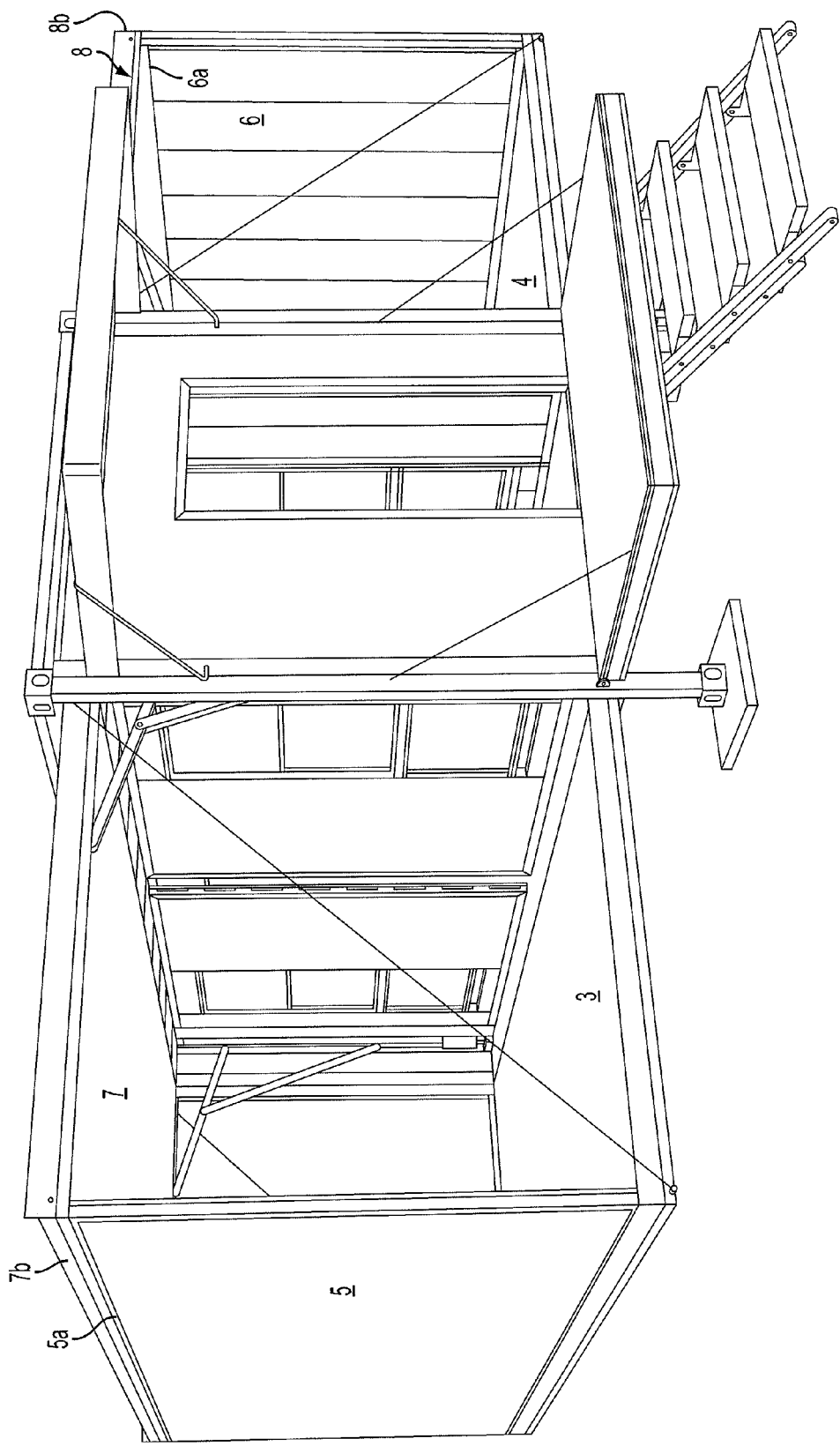
FIG. 10 is a perspective view of the exemplary embodiment of FIGS. 1 through 9 in yet another successive phase of assembly into the building unit configuration.
Figure 11:
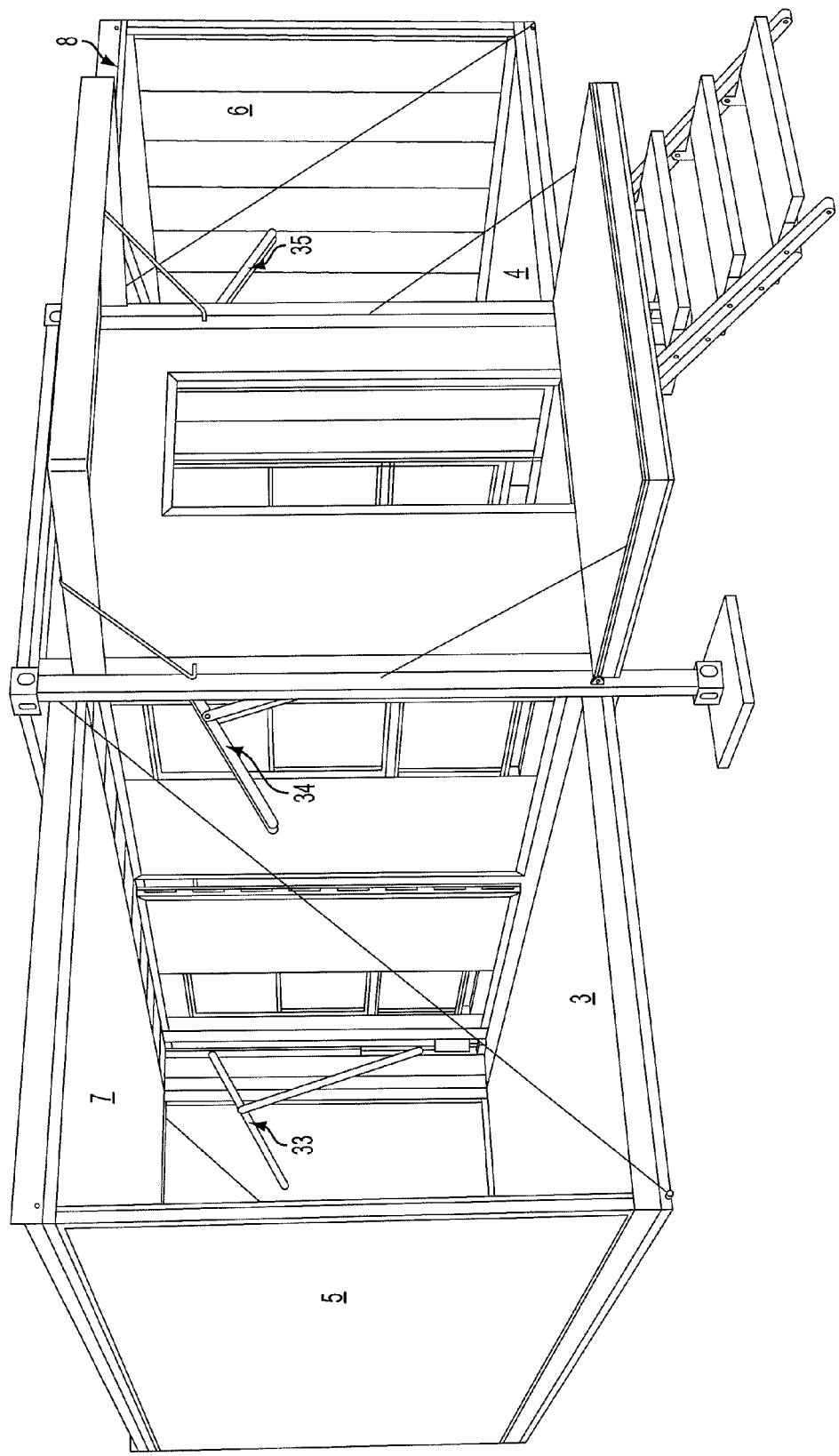
FIG. 11 is a perspective view of the exemplary embodiment of FIGS. 1 through 10 in yet another successive phase of assembly into the building unit configuration.

Further, when erected to the substantially upright position, FIGS. 9 and 10 show that a longitudinal edge or portion 5*a* and 6*a* of the now upright panel segments 5 and 6 are connected to and support a corresponding outer longitudinal edge 7*b* and 8*b* of the first set of the plurality of unit panels 7 and 8. With panel segments 5 and 6 in position, unit panels 7 and 8 rest on panel segments 5 and 6 and on the hinges that attach the unit panels 7 and 8 to the frame 12 of the container structure. At this point, since unit panels 7 and 8 are properly supported, the mechanical arms 33, 34, 35 and 36 are lowered and stowed in a second set of the plurality of unit panels 9, 10, 11 and 12, respectively, as shown in FIGS. 11 and 12 (unit panels 11 and 12 not shown).

As such each of the combined or directly associated frame panels 3 and 4 and panel segments 5 and 6 collectively define a corresponding floor portion and long sidewall portion of the building unit configuration. Furthermore, the first set of the plurality of unit panels 7 and 8 define a corresponding ceiling portion supported by the long sidewall portion of the building unit configuration (i.e., by the uprighted panel segments 5 and 6).

Figure 12:
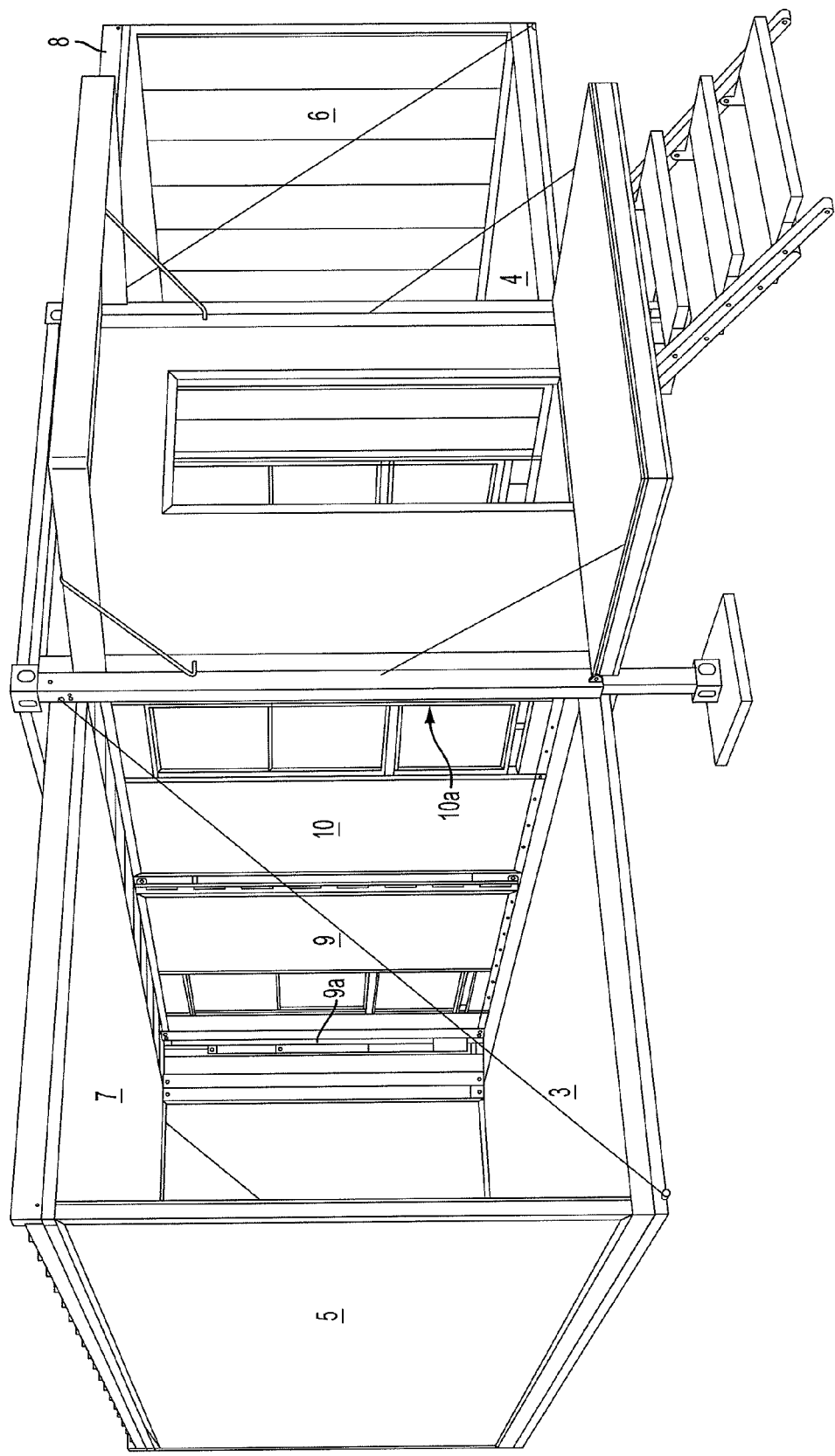
FIG. 12 is a perspective view of the exemplary embodiment of FIGS. 1 through 11 in yet another successive phase of assembly into the building unit configuration.

Additionally, a second set of the plurality of unit panels 9, 10, 11 and 12 shown in FIGS. 12-14 (unit panels 11 and 12 not shown) may also be movably connected to the frame 12 and are at least initially disposed on the interior thereof when the modular assembly 100 is in the shipping container configuration. In particular, the second set of the plurality of unit panels 9, 10, 11 and 12 are exposed after the first set of the plurality of unit panels 7 and 8 are deployed from their shipping container configuration. In at least one exemplary embodiment, the second set of the plurality of unit panels 9, 10, 11 and 12 may be pivotally or hingedly connected along a latitudinal (i.e., vertical) edge 9*a*, 10*a*, 11*a* and 12*a* or side thereof to the frame structure 12 (e.g., to a support member 14 of the frame structure 12) and may extend outwardly so as to respectively define front wall portions and rear wall portions of the building unit configuration. The second set of the plurality of unit panels 9, 10, 11 and 12 are simultaneously rotated outward, to assume their positions as front wall and rear wall portions of the building configuration, as shown in FIG. 14. The unit panels 9, 10, 11, 12 are rotated by means of a mechanism that includes a motor (not shown), a threaded bar (not shown) rotated by the motor, and scissor jacks 101. The motor and threaded bar are similar to the various motor/bar configurations discussed above. As shown in FIGS. 22A-22D, the scissor jacks 101, which are located on the ends of the container, either push or pull the levers 102, which respectively rotate the unit panels 9, 10, 11, 12. The levers 102 also pull along a segment 103 of the ceiling that covers the void left by the unit panels once they are deployed. Similarly, the ceiling segments 103 are returned to their initial position when the panels 9, 10, 11, 12 are "folded" back into the container configuration.

All motors, including motors 41(*a*)-41(*g*) are electrically coupled to a control processing unit, which controls the operation thereof according to the pre-programmed sequence stored therein. The pre-programmed sequence may be initiated by a user through an input device, and each motor can operate independently from the others.

When all the panels have been deployed to the building configuration, cables 29, 30, 31 and 32, which are threaded through the panel structure of panels 5, 6, 7 and 8, are tensioned to lock all the panels into position and create a post-tensioned structure. Once the post tensioning has been completed, cables 21, 22, 23 and 24 are released from panels 3 and 4 and retracted into the container structure, as shown in FIG. 15.

Dependent on the overall dimensions and configuration of the building unit configuration the location and relative dimensions of the "long sidewalls" and front and rear "end walls" may vary.

From the building unit configuration, the modular assembly can be converted back into the shipping container configuration by a substantially reverse automated process to that of converting the modular assembly form the shipping container configuration to the building unit configuration.

As set forth above, in order to facilitate the disposition of the modular assembly 100 into either the building unit configuration or the shipping container configuration the automated erection system is provided. The automated erection system performs an automatic, pre-programmed sequence by way of electric motors, gears, pulleys, cables, automated mechanical arms and electronic controls, and the like to convert the modular assembly between the two configurations. The pre-programmed sequence may be stored in a computer-readable medium. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Thus, the modular assembly 100 can be converted between the two configurations quickly and easily without special equipment.

Figure 20:
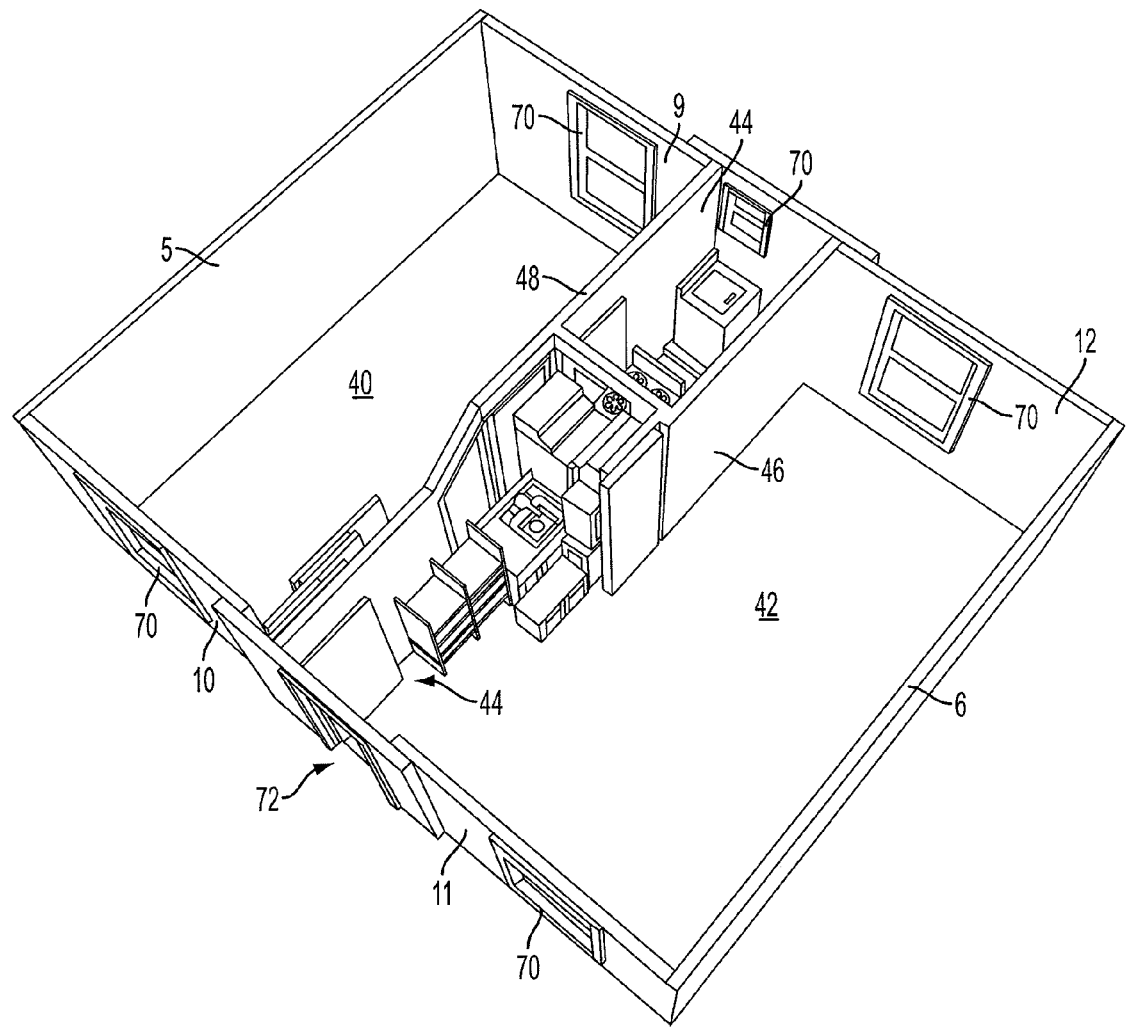
FIG. 20 is a perspective overhead view of the interior of the modular assembly when in the building unit configuration.
Figure 21:
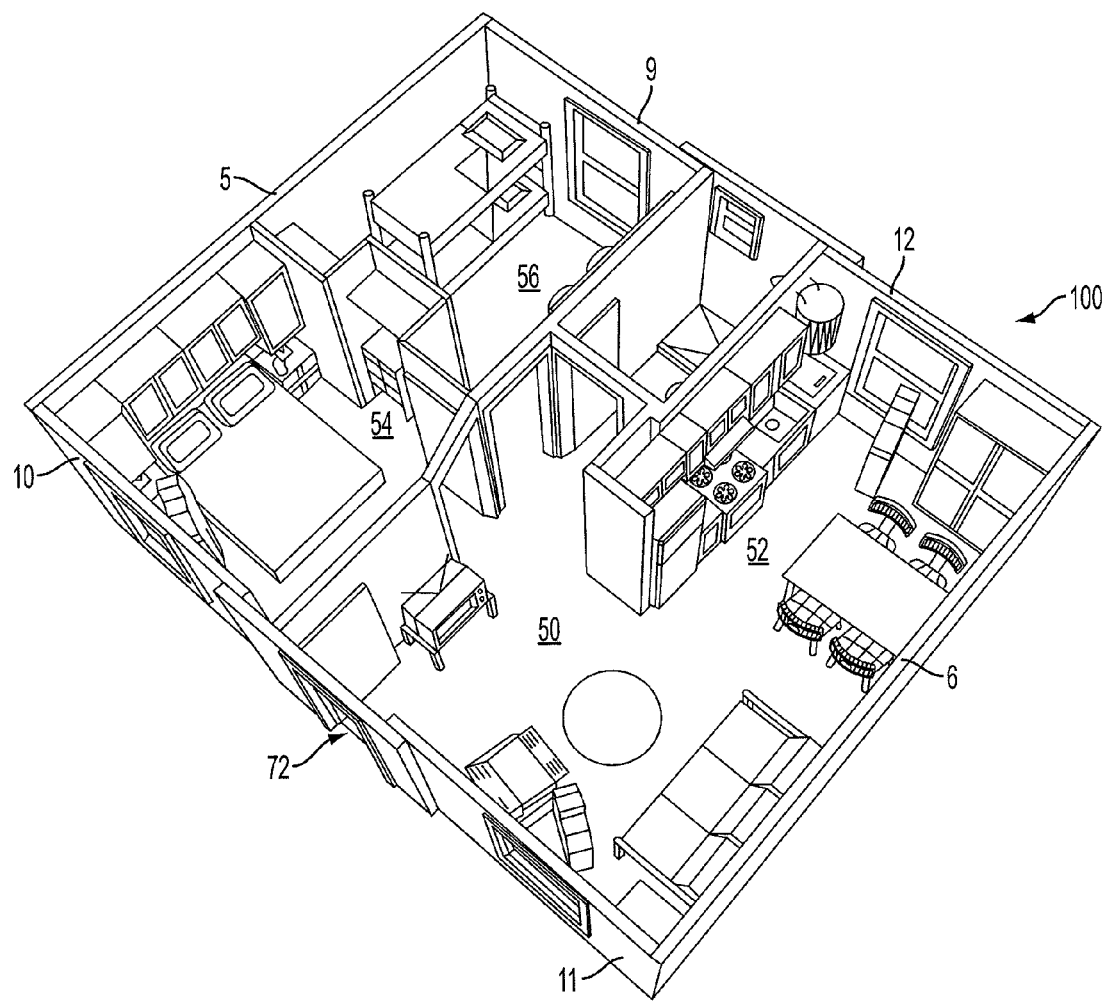
FIG. 21 is a perspective overhead view of an exemplary embodiment of the interior of the modular assembly in building unit configuration with appliances, shelves, cabinets, closets, furnishings and partitions in place.
Figure 22A:
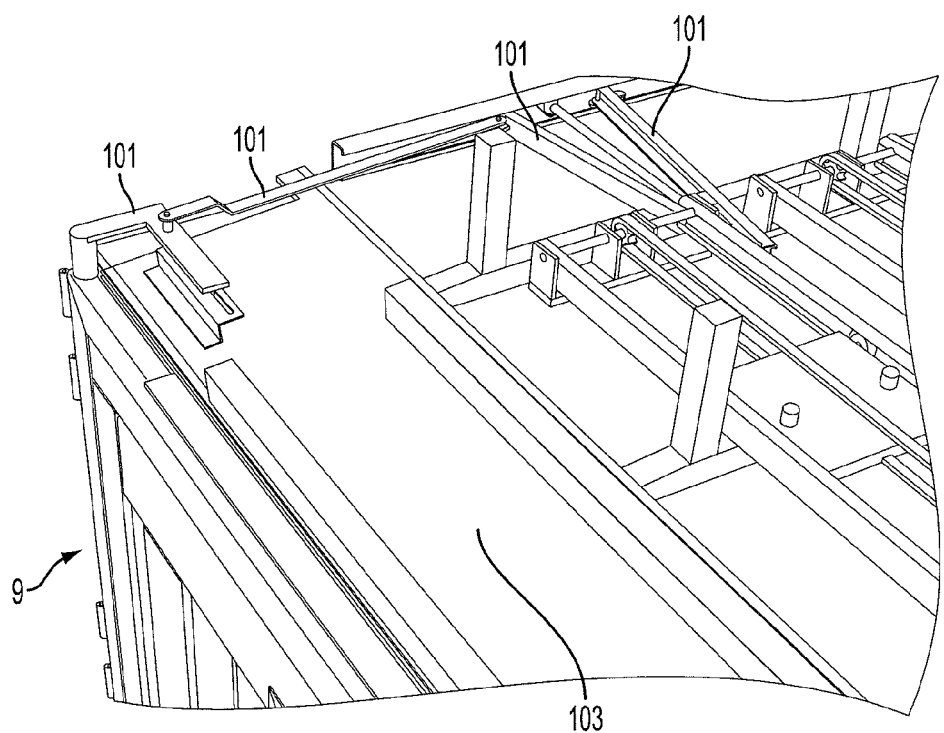
FIGS. 22A to 22D are views showing the mechanisms for moving a second set of panels.
Figure 22B:
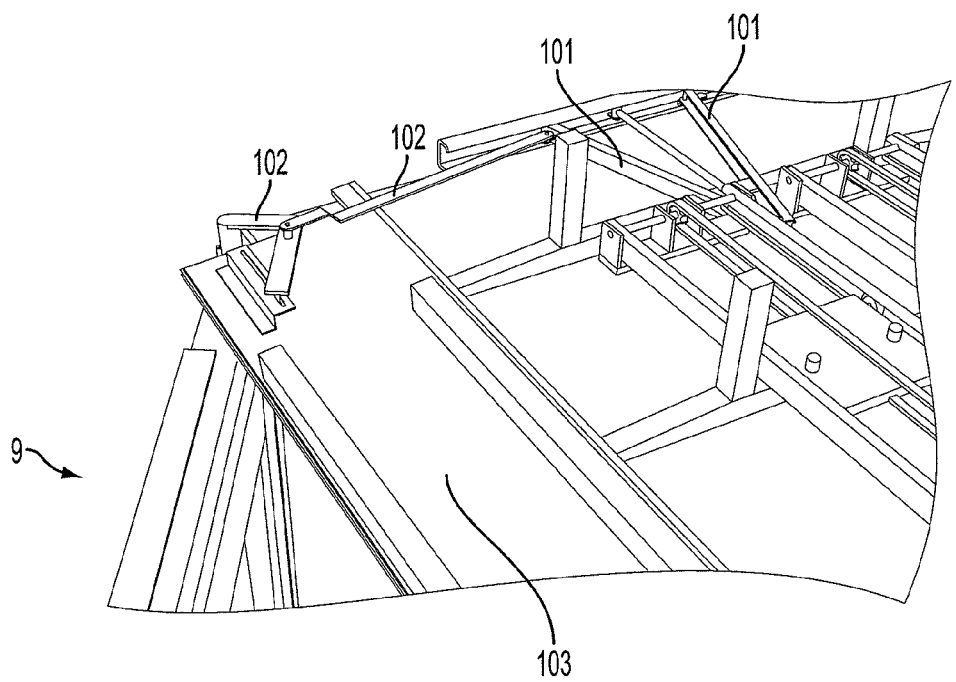
Figure 22C:
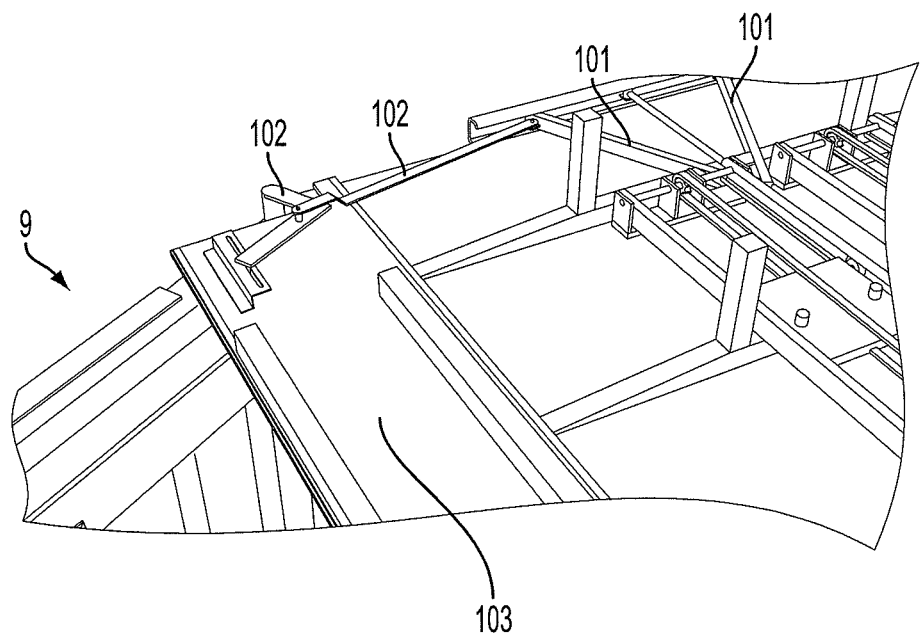
Figure 22D:
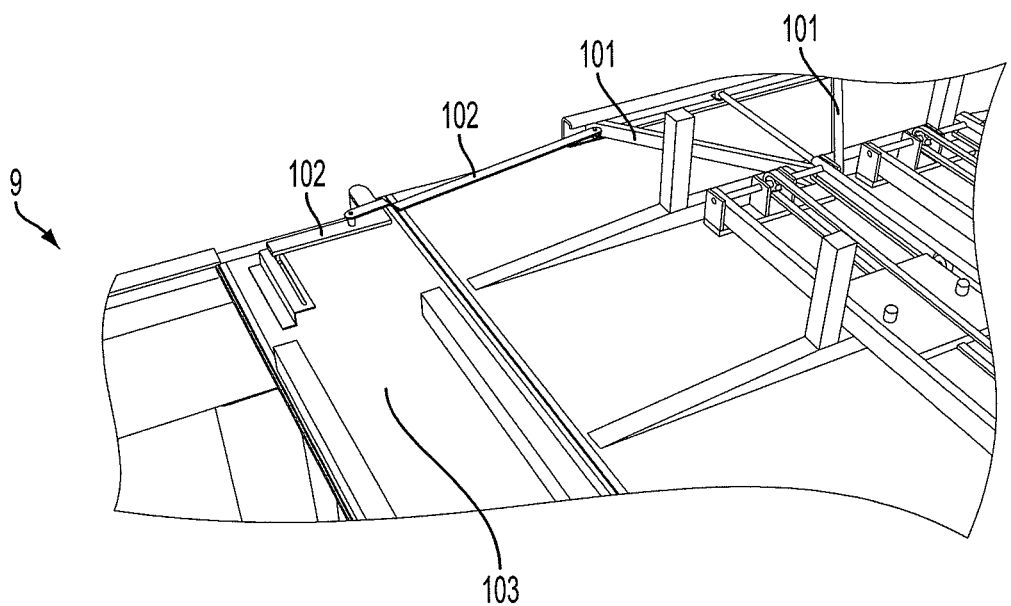

When fully assembled into the building unit configuration of FIG. 15, the interior thereof is represented, for example, in FIGS. 20 and 21. The interior of the building unit configuration is preferably, but not exclusively, formed into a plurality of sections 40, 42 and 44 at least partially separated from one another. However, the sections 40, 42 and 44 are disposed in communicating, accessible relation with one another in order to allow occupants to pass easily between the various sections 40, 42 and 44. At least partially segregating the sections 40, 42 and 44 is a partition assembly 46 and 48, which effectively defines interior wall portions of the building unit configuration. The partitions or interior wall units 46 and 48 separate what may be referred to as a primary or main room 50 and kitchen or utility area 52 from separate, at least partially segregated bedrooms or other room areas 54 and 56. Also, a bathroom area generally indicated as 60 may also be defined by the interior walls or partitions 46 and 48.

In addition to the above various appliances or utilities may be included in appropriate portions of the interior of the building unit configuration. Such additional appliances or facilities may include kitchen cabinets which can be affixed to the kitchen or other utility area 52 by means of tracks or like coupling or installation structures. In addition, water, sewer and electric utility connections as well as appropriate sinks, bathing facilities, stove or ranges, refrigerators, air conditioners, etc. may also be appropriately positioned on the interior of the building unit construction as generally represented in FIG. 15.

In addition appropriate windows 70, door(s) 72, doorways, halls or passageways (see FIGS. 20 and 21) are pre-structured and appropriately disposed in the various portions of the frame 12, partitions 46 and 48, panel segments 5 and 6 or unit panels defining the end walls as 9, 10, 11 and 12.

The mechanisms that transform the modular assembly from a shipping container configuration to a building unit configuration have been designed so that there are no elements that project beyond the planes that define the building unit configuration. This allows the transformation of the modular assemblies between the two configurations even when they are stacked vertically, the modular assemblies can be stacked and grouped together to from multi-story buildings quickly and efficiently.

The ability to stack and interconnect the modular assemblies while in the shipping container configuration simplifies the construction process and greatly reduces the risks by not having to stack the units while fully deployed. Even the utilities can be connected while the units are stacked in the shipping container configuration since the modular assemblies have factory installed piping and wiring with connection points readily accessible at the rear of the assembly, making it very simple to connect to the risers installed on site.

A foundation for these buildings is a prefabricated reinforced concrete slab designed to comply with local building codes, soil conditions and structural considerations, anchoring of the modular unit to the foundation slab can be achieved in many ways. One exemplary way is described later. However, the anchoring system should be designed to comply with the structural requirements of the erection site and additional structural reinforcements will be specified for sites where dynamic loads must be taken into consideration (e.g., wind and earthquakes), the addition of these elements does not alter the basic erection procedure.

The vertical and horizontal circulation modules for the building unit configuration are not shown at this point since they vary according to the layout of the stacked unit modules. They are, however, also modular and are deployed and connected to the unit modules with the same ease as the stacking of the modular assemblies.

Another feature of this stackable configuration is that it is just as easily disassembled, and can be relocated using the same components, including the foundation slab, for emergency situations in high density urban areas. These multi-story building assemblies can be erected on borrowed or leased pieces of land and removed when the emergency situation has been resolved.

FIG. 23 shows a prefabricated foundation slab 200 used for supporting modular assemblies. In particular, the foundation slab is useful in instances when stacking two or more modular assemblies on top of each other to form multi-story buildings because the foundation slab provides an added foundation for supporting the weight of the multi-story structure. In the case of a multi-story building, a base surface of a central frame of the lower most modular assembly is disposed on the foundation slab. The size and reinforcement of the foundation slab may depend on the quality of the soil and local construction codes.

The foundation slab may include a plurality of connectors 201 integrated therein and which connect to the central frame of the modular assembly. The central frame, for example, may have openings for receiving the connectors.

FIG. 24 shows a first modular assembly 100a similar to that shown in FIGS. 1-15 connected to the foundation slab 200 shown in FIG. 23. In particular, a base surface and an upper surface of the central frame of the modular assembly include a plurality of openings 202 which are configured to receive connectors, including connectors 201. The openings disposed on the upper surface of the central frame are configured to be connected to the openings disposed on the base surface of another modular assembly stacked thereon via connectors.

Figure 25:
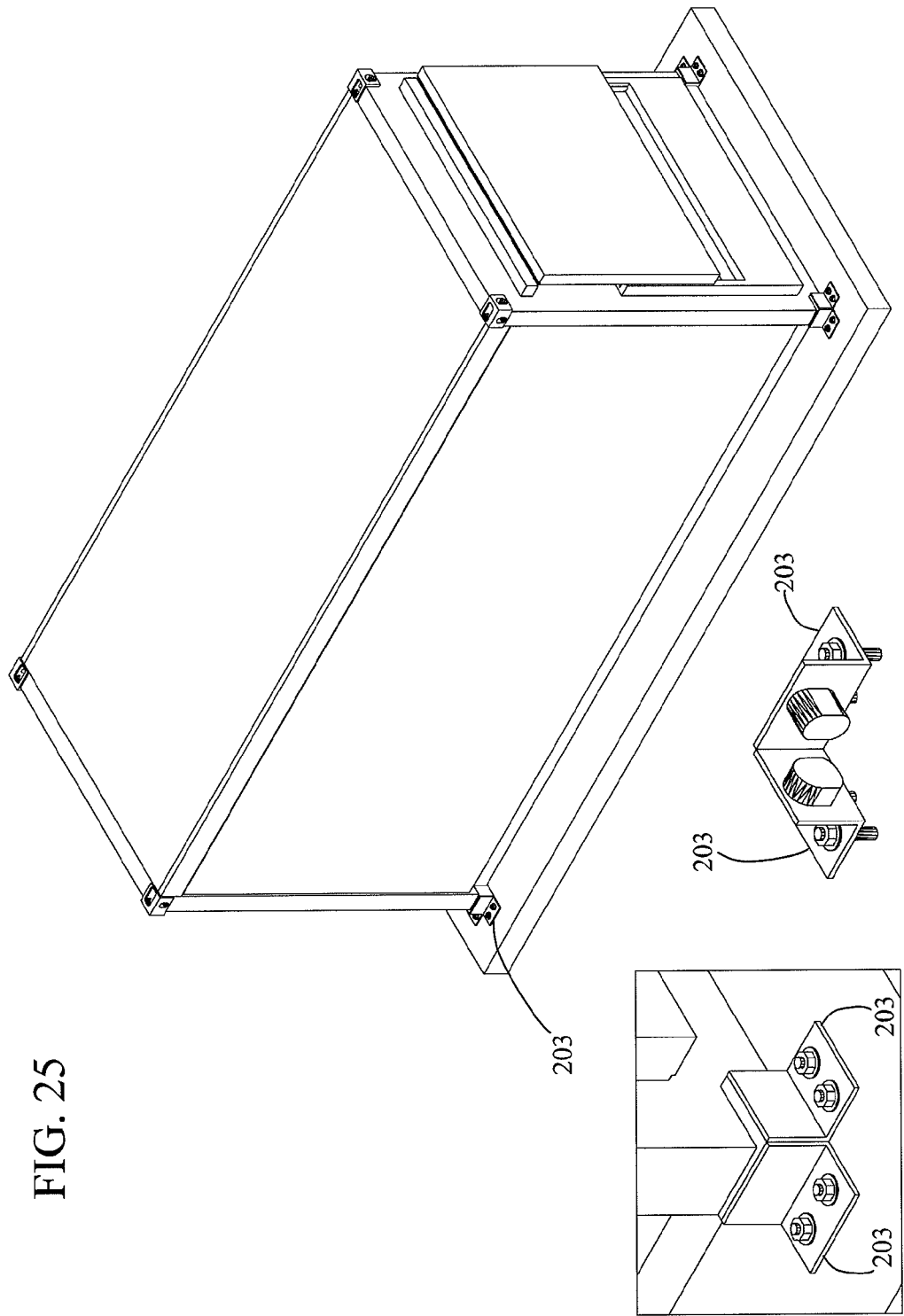
FIG. 25 is a perspective view of an exemplary embodiment of the modular assembly connected to the foundation slab shown in FIG. 24.

FIG. 25 shows additional connectors 203 fixed to the modular assembly 100a and the foundation slab 200.

Figure 26:
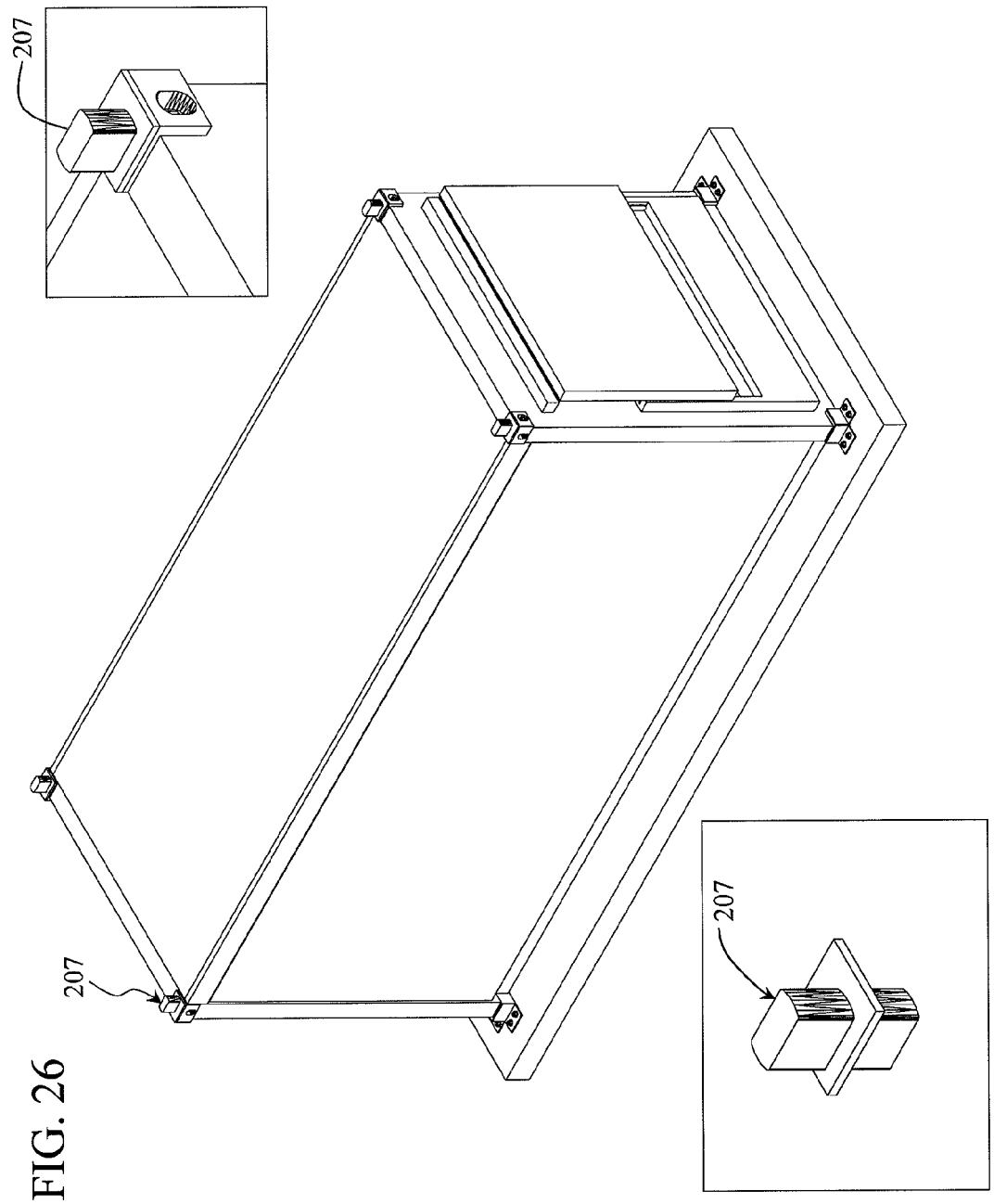
FIG. 26 is a perspective view of an exemplary embodiment of the modular assembly having connectors configured to receive a second modular assembly stacked on the modular assembly.

FIG. 26 shows connectors 207 which are inserted between a two modular assemblies. In particular, connectors 207 are inserted in the openings 202 of the two modular assemblies in order to link the two modular assemblies together and to stabilize the upper modular assembly on the lower modular assembly.

Figure 27:
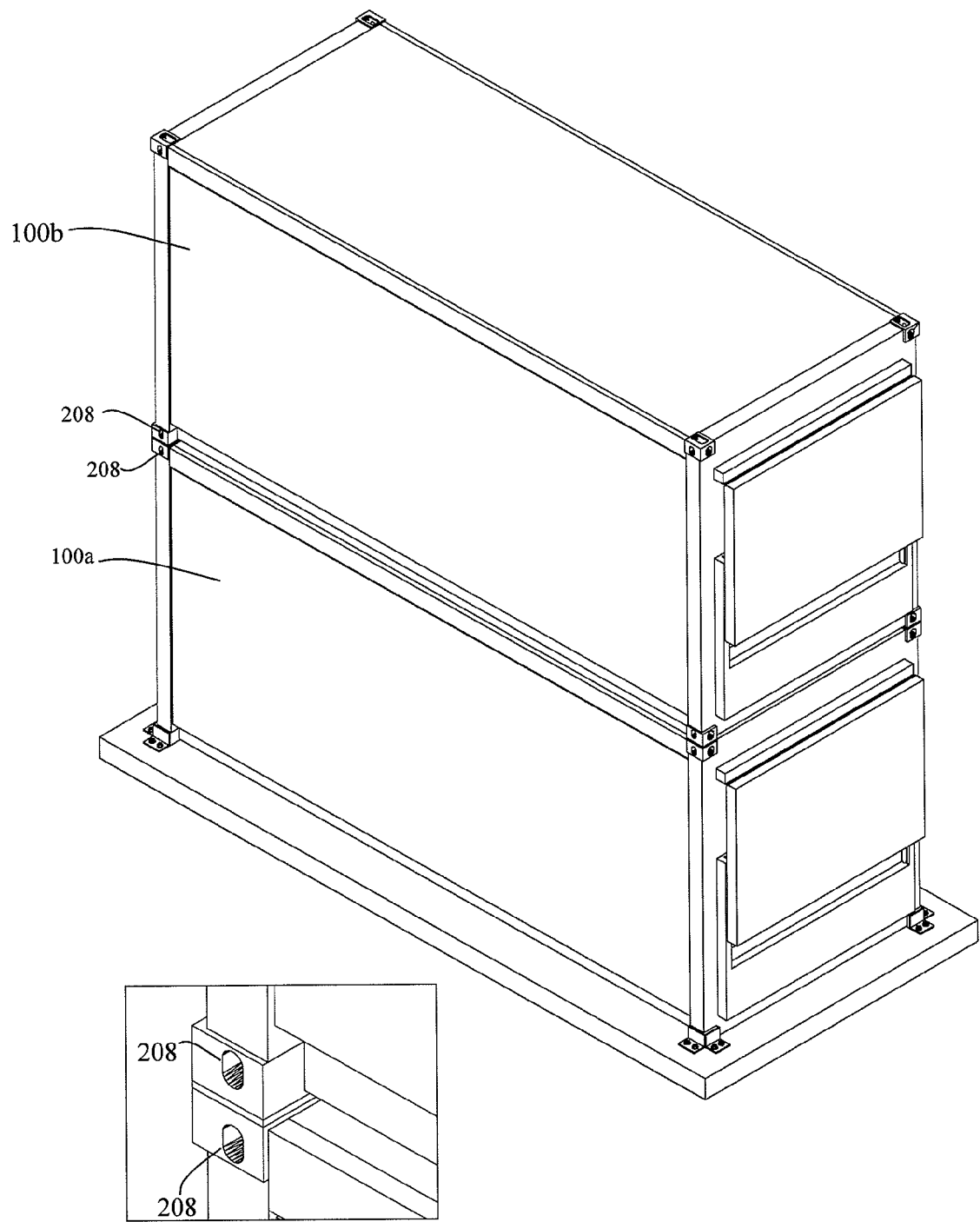
FIG. 27 is a perspective view of an exemplary embodiment of a second modular assembly stacked on top of a first modular assembly.
Figure 28:
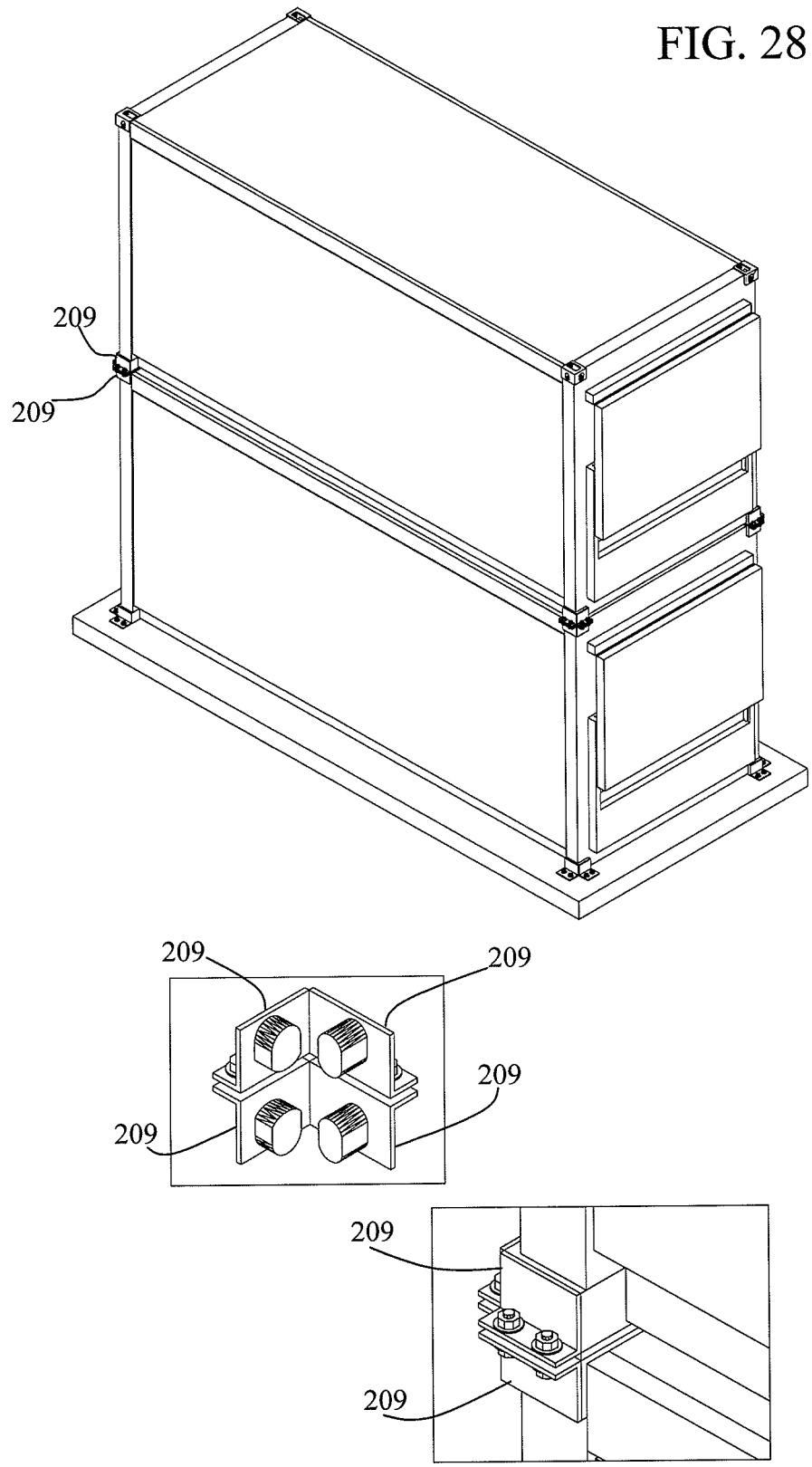
FIG. 28 is a perspective view of an exemplary embodiment of connecting second modular assembly to the first modular assembly shown in FIG. 27.

FIG. 27 shows a second modular assembly 100b stacked on top of the first modular assembly 100a, both in the shipping container configuration. Each modular assembly may have additional side openings 208 for receiving side connectors 209 shown in FIG. 28 for coupling the first modular assembly 100a and the second modular assembly 100b together.

Figure 29:
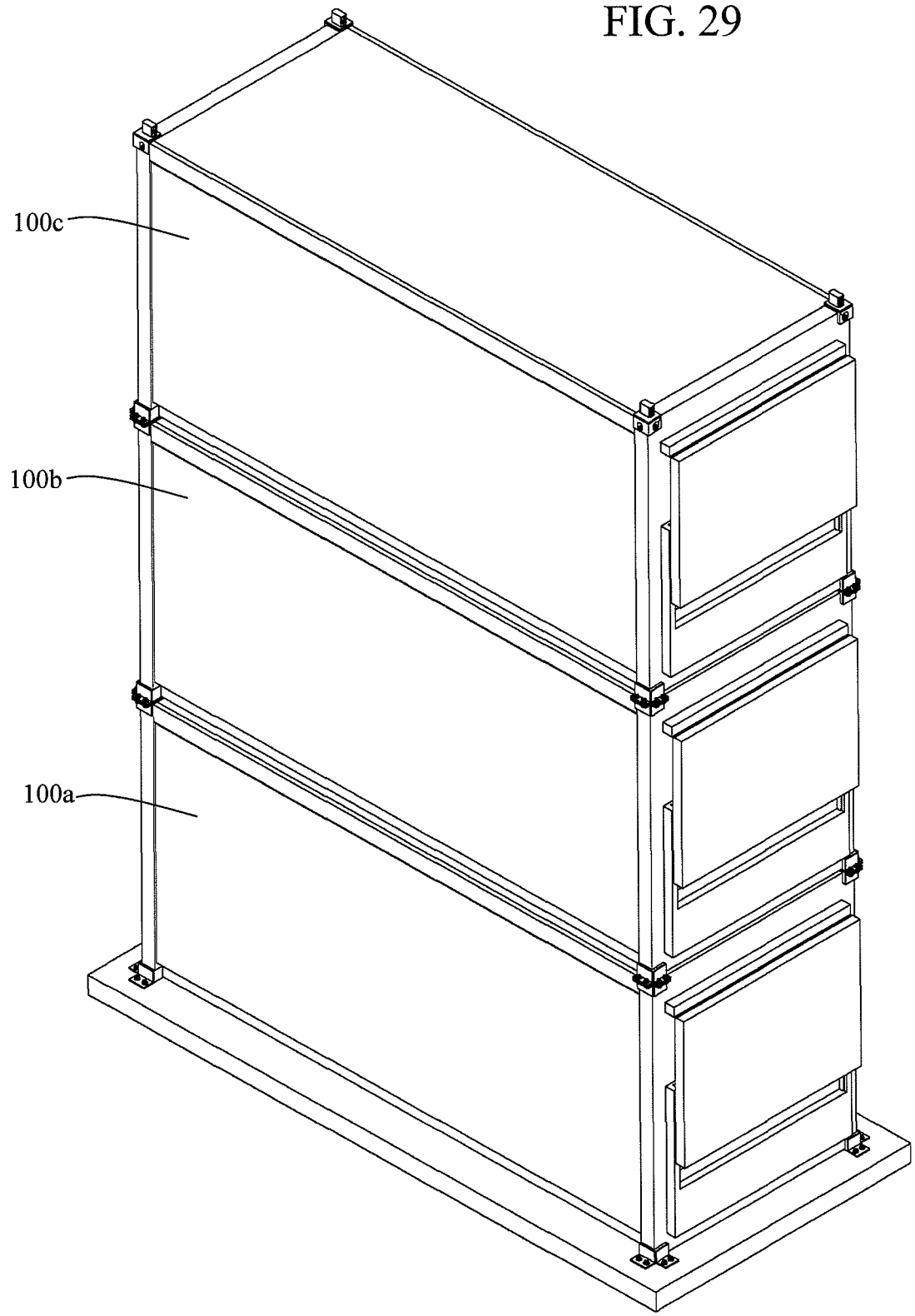
FIG. 29 is a perspective view of an exemplary embodiment of a third modular assembly stacked on top of first and second modular assemblies.

FIG. 29 shows a third modular assembly 100c stacked on top of the first modular assembly 100a and the second modular assembly 100b, each in the shipping container configuration.

Figure 30:
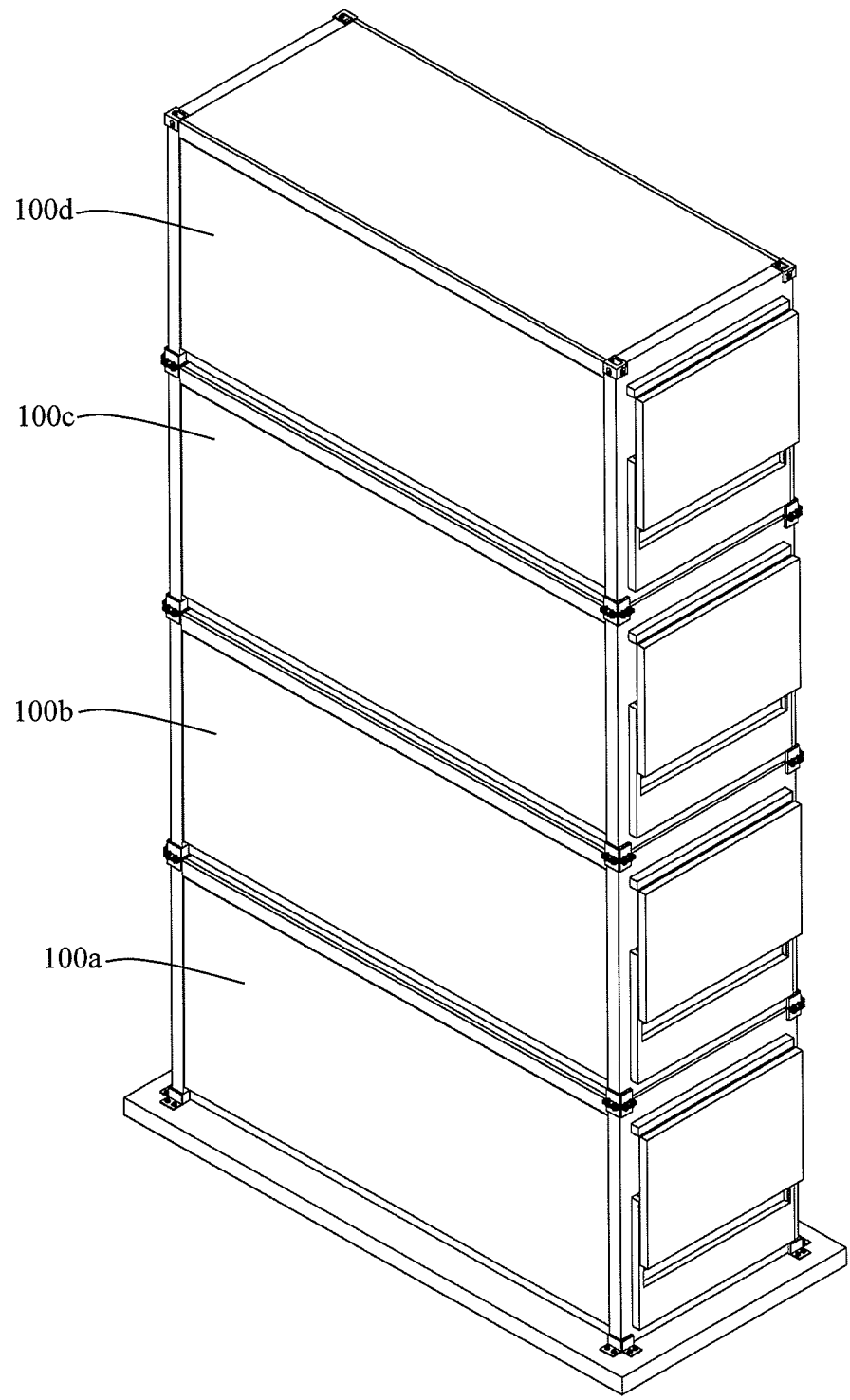
FIG. 30 is a perspective view of an exemplary embodiment of a fourth modular assembly stacked on top of first, second and third modular assemblies.

FIG. 30 shows a fourth modular assembly 100d stacked on top of the first, second and third modular assemblies 100a, 100b and 100c, each in the shipping container configuration. Additional modular assemblies may be added in a similar manner.

Each modular assembly 100a, 100b, 100c and 100d can be transformed between the shipping container configuration and building unit configuration after stacking and securing the modular assemblies. Each modular assembly can be operated, and thus transformed, independently of the other modular assemblies.

Figure 31:
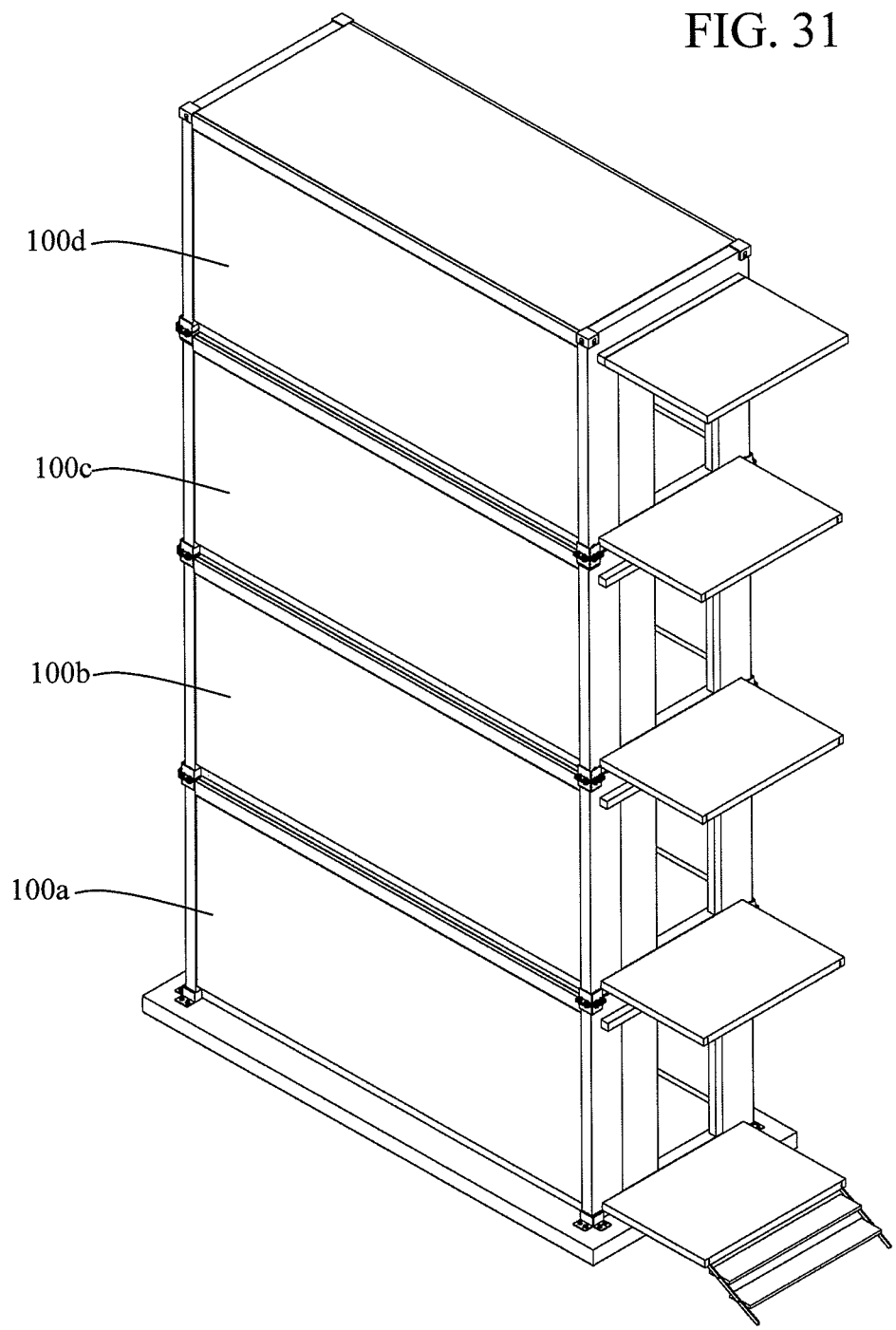
FIG. 31 is a perspective view of the exemplary embodiment of FIG. 30 in a successive step of assembly from the shipping container configuration to the building unit configuration.

FIG. 31 shows a successive step of assembly from the shipping container configuration to the building unit configuration, wherein each modular assembly 100a, 100b, 100c and 100d has a configuration similar to that shown in FIG. 4 where a front porch and roof are deployed.

Figure 32:
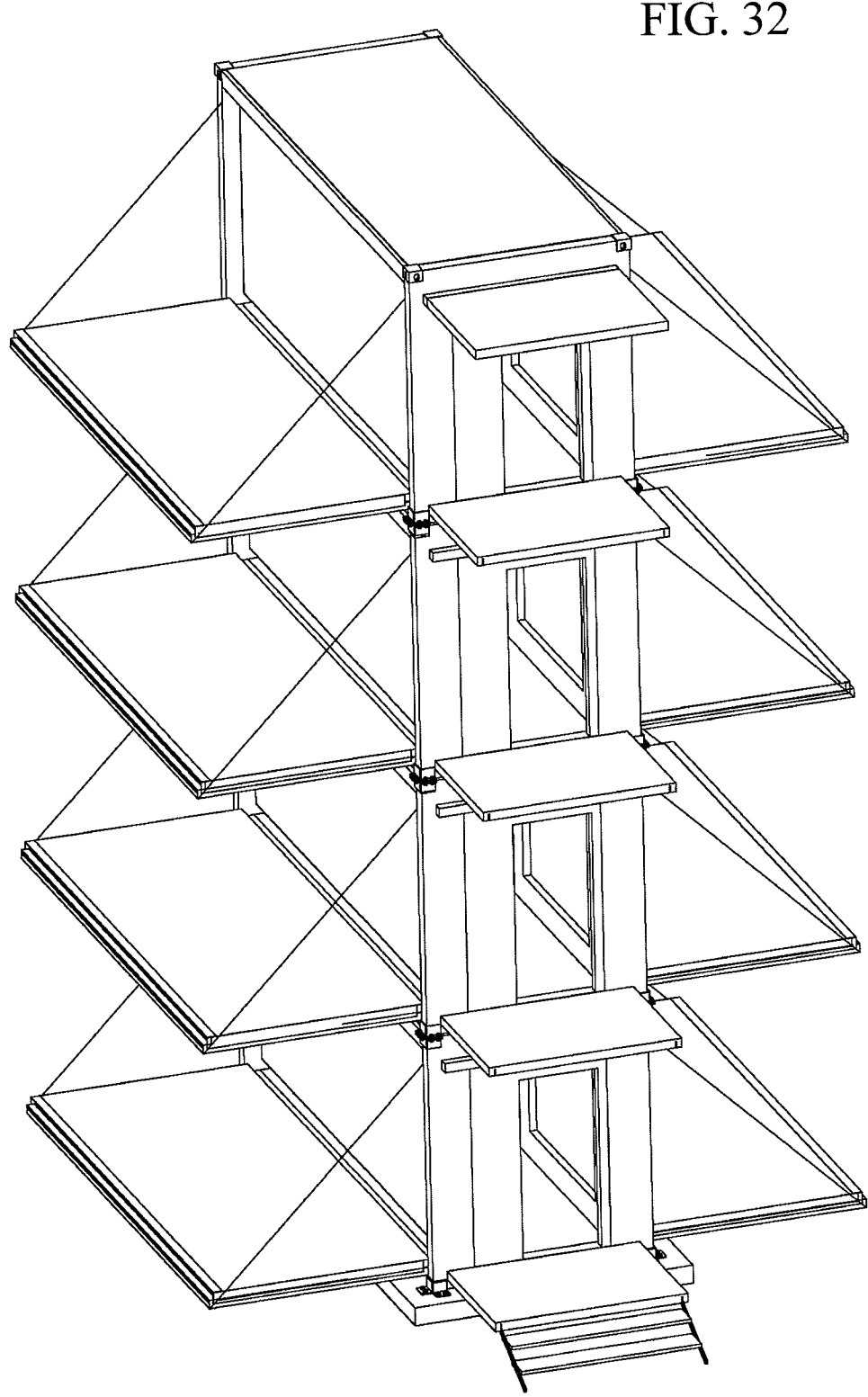
FIG. 32 is a perspective view of the exemplary embodiment of FIGS. 30 and 31 in yet another successive step of assembly from the shipping container configuration to a building unit configuration.

FIG. 32 shows another successive step of assembly from the shipping container configuration to the building unit configuration, wherein each modular assembly 100a, 100b, 100c and 100d has a configuration similar to that shown in FIG. 6 where floor panels are deployed.

Figure 33:
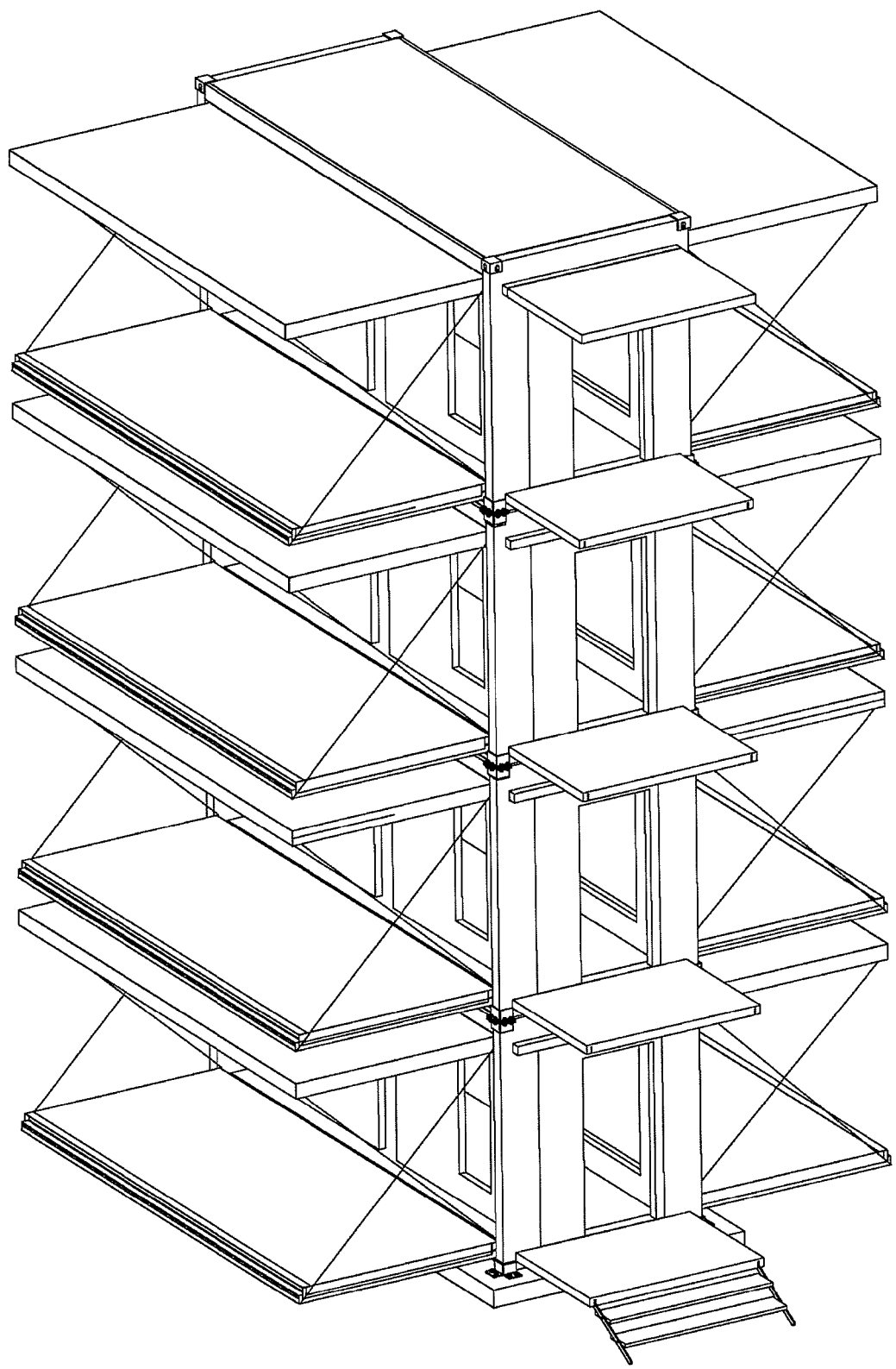
FIG. 33 is a perspective view of the exemplary embodiment of FIGS. 30 through 32 in yet another successive phase of assembly into the building unit configuration.

FIG. 33 shows another successive step of assembly from the shipping container configuration to the building unit configuration, wherein each modular assembly 100a, 100b, 100c and 100d has a configuration similar to that shown in FIG. 8 where roof panels are deployed.

Figure 34:
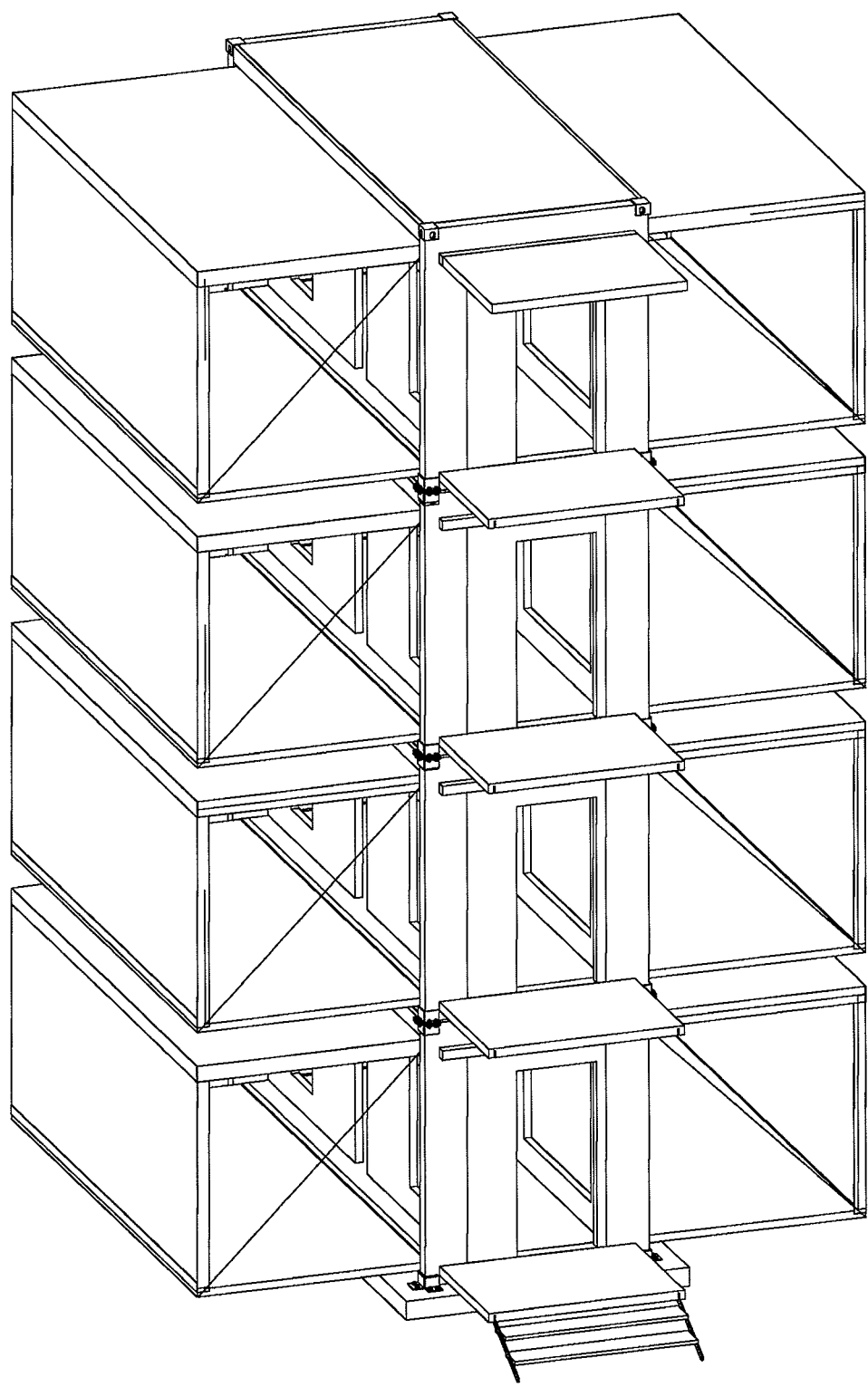
FIG. 34 is a perspective view of the exemplary embodiment of FIGS. 30 through 33 in yet another successive phase of assembly into the building unit configuration.

FIG. 34 shows another successive step of assembly from the shipping container configuration to the building unit configuration, wherein each modular assembly 100a, 100b, 100c and 100d has a configuration similar to that shown in FIG. 10 where side walls are deployed.

Figure 35:
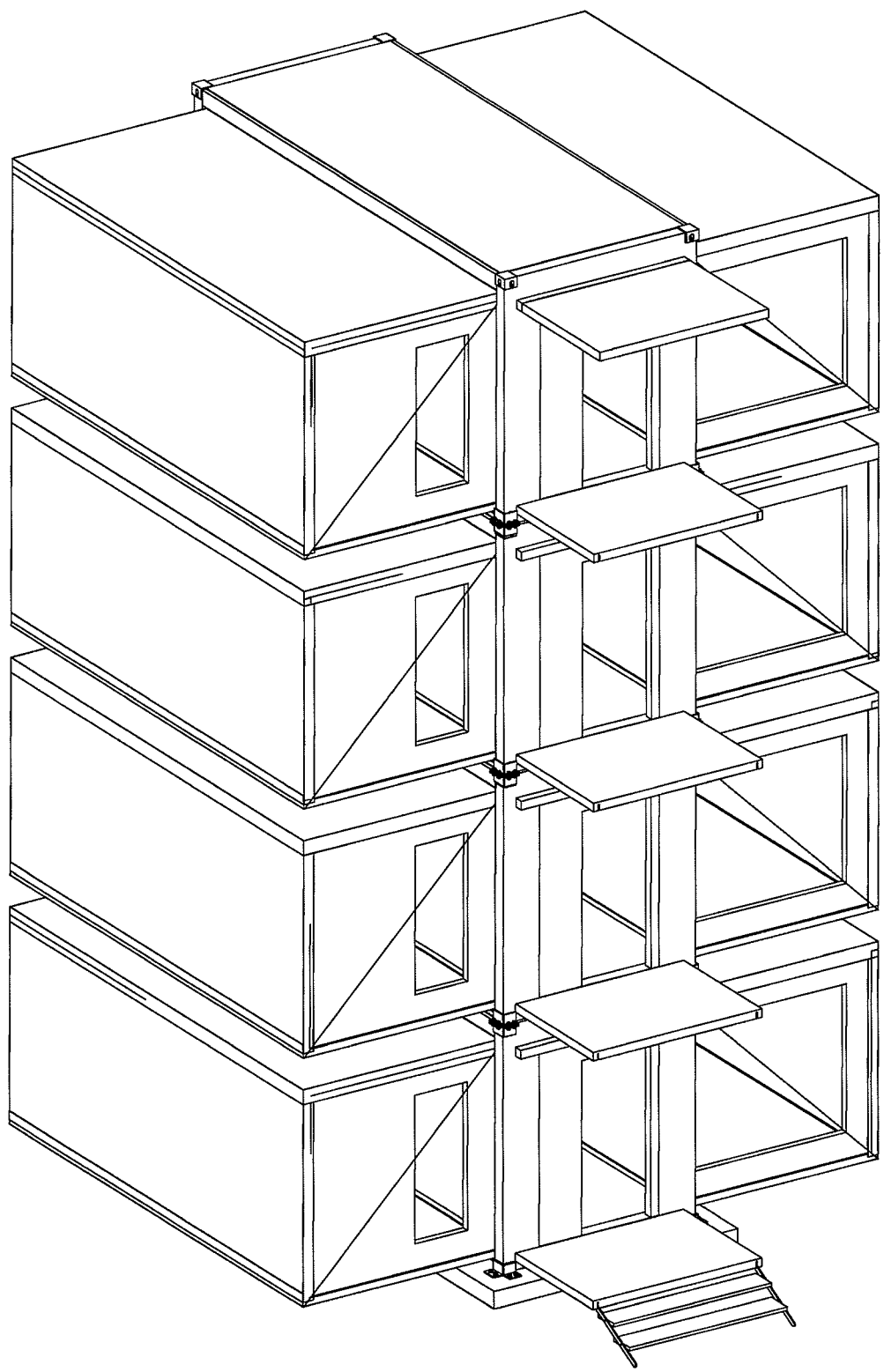
FIG. 35 is a perspective view of the exemplary embodiment of FIGS. 30 through 34 in yet another successive phase of assembly into the building unit configuration.

FIG. 35 shows another successive step of assembly from the shipping container configuration to the building unit configuration, wherein each modular assembly 100a, 100b, 100c and 100d has a configuration similar to that shown in FIG. 14 where front and back panels are deployed.

Figure 36:
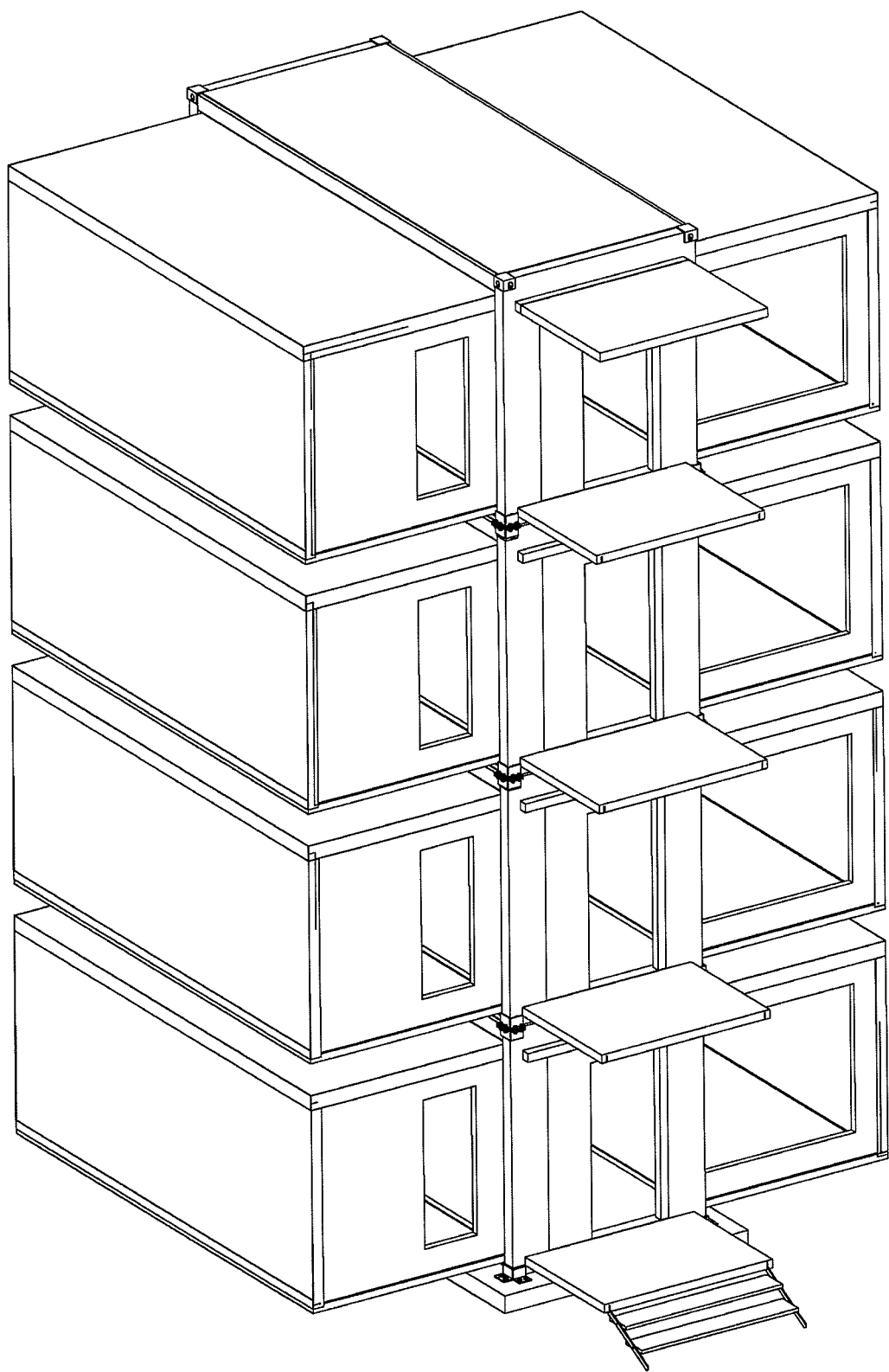
FIG. 36 is a perspective view of the exemplary embodiment of FIGS. 30 through 35 in yet another successive phase of assembly into the building unit configuration.

FIG. 36 shows another successive step of assembly from the shipping container configuration to the building unit configuration, wherein each modular assembly 100a, 100b, 100c and 100d has a configuration similar to that shown in FIG. 15 where cables are retracted.

Figure 37:
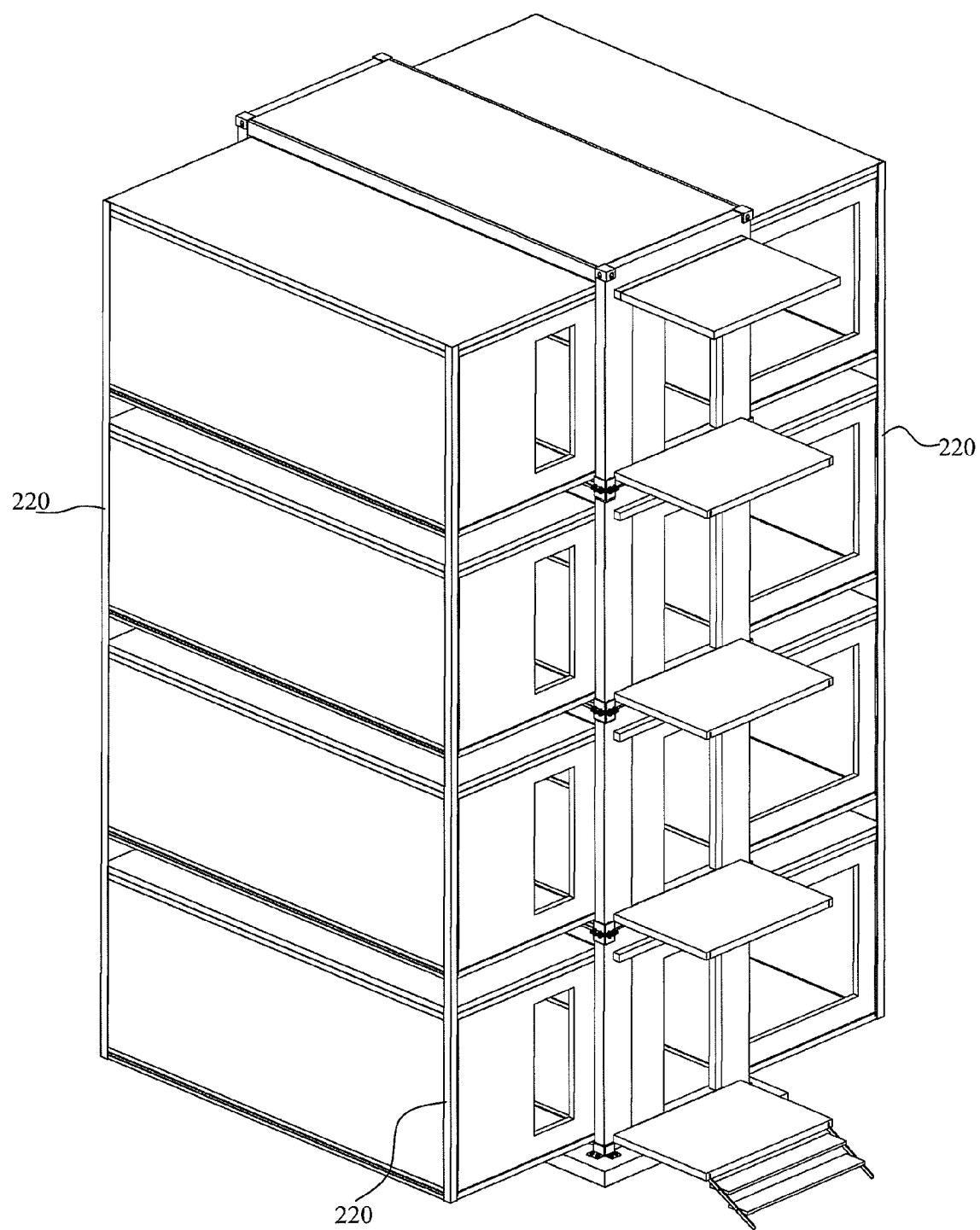
FIG. 37 is a perspective view of the exemplary embodiment of FIGS. 30 through 36 in yet another successive phase of assembly into the building unit configuration.

FIG. 37 shows another successive step of assembly from the shipping container configuration to the building unit configuration, wherein each modular assembly 100a, 100b, 100c and 100d has a configuration similar to that shown in FIG. 36, except reinforcement rails 220 are added vertically at each corner of the multi-story structure to add additional support to the structure. For example, the reinforcement rails may be installed in accordance with local construction codes, and to resist dynamic forces such as wind (e.g., hurricanes) and soil movements (e.g., earthquakes). In FIG. 37, an angled rail is used in the four corners of the cantilevered sides to tie together the units, thus creating a more rigid structure.

Because many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

The invention claimed is:

1. A building assembly comprising:
 a plurality of modular assemblies stacked on top of each other in a shipping container configuration, each modular assembly structured to assume either the shipping container configuration or a building unit configuration and including
 a central frame which defines a box-shaped shipping container;
 a plurality of frame panels disposable in a substantially closed, interconnected position to at least partially define the shipping container;
 the plurality of frame panels moveably disposed outwardly from the frame into an opened position to at least partially define the building unit configuration;
 a plurality of unit panels movably connected to and disposable on the frame in a closed position aligned with the frame panels being in the closed position; and
 the plurality of unit panels movably disposable outwardly from the frame into fan opened position to further at least partially define the building unit configuration,
 wherein the central frame comprises a plurality of fixed interconnected columns which form an exterior frame of the modular assembly when the modular assembly is in the shipping container configuration,
 the plurality of fixed interconnected columns of the central frame form a frame of a core structure of the modular assembly when the modular assembly is in the building unit configuration,
 wherein each modular assembly of the plurality of modular assemblies is converted between the shipping container configuration and the building unit configuration while disposed in a stacked position,
 wherein during conversion between the shipping container configuration and the building unit configuration, the plurality of unit panels do not cross substantially above a plane defined by an uppermost surface of the central frame,
 wherein each modular assembly includes an automated erection system which converts the modular assembly entirely between the shipping container configuration and the building unit configuration, and vice versa, according to an automatic, pre-programmed sequence that is initiated by a single input,
 wherein the automated erection system is coupled to each of the plurality of frame panels and to each of the plurality of unit panels to change the disposition thereof according to the pre-programmed sequence,
 wherein each of the plurality of frame panels is moveably connected along a lower most longitudinal end to the central frame and positioned to define a floor portion of the building unit configuration, and
 the automated erection system includes a first plurality of cables attached at one end to an upper most longitudinal end of individual ones of the plurality of frame panels and attached at another end to a pulley carriage that is displaced according to the pre-programmed sequence,
 wherein the each of the plurality of frame panels includes at least one panel segment movably connected to a corresponding frame panel of the plurality of frame panels and positionable outwardly therefrom to further at least partially define a sidewall portion of the building unit configuration,
 the at least one panel segment is moveably connected at an upper most longitudinal end of the corresponding frame panel, and
 the automated erection system includes a second plurality of cables which are threaded through the at least one panel segment and are displaced according to the pre-programmed sequence.

2. The building assembly according to claim 1, wherein the plurality of unit panels includes a first set of unit panels movably connected along an upper most longitudinal end to the central frame and positionable outwardly therefrom into the opened position to define different ceiling portions of the building unit configuration, and
 the automated erection system includes a plurality of automated mechanical arms controlled by a third plurality of cables and the plurality of automated mechanical arms are coupled to the first set of unit panels to change the disposition thereof according to the pre-programmed sequence.

3. The building assembly according to claim 2, wherein the plurality of unit panels includes a second set of unit panels movably connected along a latitudinal end to the central frame and positionable outwardly therefrom into the opened position to collectively define front and rear end wall portions of the building unit configuration, and
 the automated erection system includes a plurality of electromechanical column actuators, each of the plurality of electromechanical actuators rotates one of the second set of unit panels to change the disposition thereof according to the pre-programmed sequence.

4. The building assembly according to claim 1,
wherein each of the modular assemblies other than a lowermost modular assembly is supported by only four support members which extend from the central frame and elevate the modular assembly from another respective modular assembly,
wherein the only four support members each include at least one protrusion and at least one opening, the opening configured to receive the at least one protrusion.

5. The building assembly according to claim 4, wherein a lowermost modular assembly is supported by only four support members which extend from the central frame and elevate the modular assembly from a terrain when the modular assembly is in the building unit configuration.

6. The building assembly according to claim 4, wherein each of the only four support members comprise a connector which is inserted between two modular assemblies, the at least one protrusion being on the connector and the at least one opening being in the modular assemblies.

* * * * *